United States Patent
Asakura et al.

(10) Patent No.: US 8,397,859 B2
(45) Date of Patent: Mar. 19, 2013

(54) ELECTRIC POWER STEERING SYSTEM

(75) Inventors: Toshihiro Asakura, Chiryu (JP);
Takashi Hara, Toyokawa (JP);
Masayoshi Asakura, Okazaki (JP)

(73) Assignee: JTEKT Corporation, Osaka (JP)

( * ) Notice: Subject to any disclaimer, the term of this patent is extended or adjusted under 35 U.S.C. 154(b) by 96 days.

(21) Appl. No.: 12/861,164

(22) Filed: Aug. 23, 2010

(65) Prior Publication Data
US 2011/0048838 A1 Mar. 3, 2011

(30) Foreign Application Priority Data

Aug. 31, 2009 (JP) ................. 2009-199786
Aug. 31, 2009 (JP) ................. 2009-199787
Dec. 8, 2009 (JP) ................. 2009-278195

(51) Int. Cl.
*B62D 5/04* (2006.01)
(52) U.S. Cl. ........................................ 180/444
(58) Field of Classification Search .............. 180/444
See application file for complete search history.

(56) References Cited

U.S. PATENT DOCUMENTS

| 5,988,311 A | 11/1999 | Kuribayashi et al. |
| 6,439,339 B1 | 8/2002 | Namgung |
| 2002/0063014 A1 | 5/2002 | Yoshida et al. |
| 2004/0154857 A1* | 8/2004 | Fukuda et al. ............ 180/444 |
| 2009/0255752 A1 | 10/2009 | Asakura et al. |
| 2010/0200326 A1 | 8/2010 | Asakura et al. |
| 2010/0206656 A1 | 8/2010 | Asakura et al. |

FOREIGN PATENT DOCUMENTS

| DE | 10 2007 024 328 A1 | 11/2008 |
| EP | 0 882 637 A1 | 12/1998 |
| JP | A-6-255501 | 9/1994 |
| JP | A-2006-224938 | 8/2006 |
| JP | A-2006-256414 | 9/2006 |
| JP | A-2007-239782 | 9/2007 |

OTHER PUBLICATIONS

European Search Report for corresponding European Patent Application No. 10174450.6, mailed on Nov. 25, 2010.
European Search Report for corresponding European Patent Application No. 10174451.4, mailed on Nov. 25, 2010.
New U.S. Patent Application filed Aug. 23, 2010 for Toshihiro Asakura et al, entitled "Electric Power Steering System".
Jul. 4, 2012 Patent Office Communication issued in European Patent Application No. 10174450.6.
Nov. 30, 2012 Office Action issued in European Patent Application No. 10 174 450.6-1264.

* cited by examiner

*Primary Examiner* — Tony Winner
(74) *Attorney, Agent, or Firm* — Oliff & Berridge, PLC

(57) ABSTRACT

In an electric power steering system, multiple cutouts (45) are formed in a flange portion (36) formed on an axial end portion (23a) of a ball screw nut (23) of a ball screw device that drives a rack shaft. In addition, a motor shaft (6) has a thin-plate portion (44) that extends on the radially outer side of the ball screw nut (23). When the thin-plate portion (44) that extends from the motor shaft (6) is swaged into the cutouts (45) that serve as engagement recesses that have side walls in the circumferential direction, the rotation of the ball screw nut (23) relative to the motor shaft (6) is restricted.

19 Claims, 29 Drawing Sheets

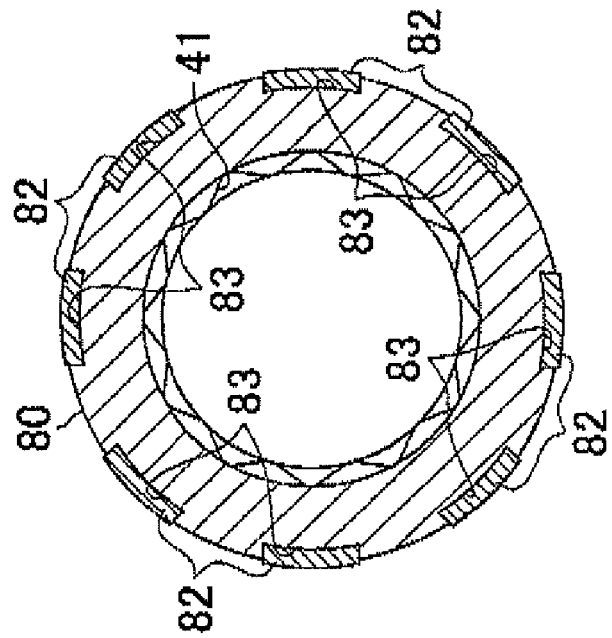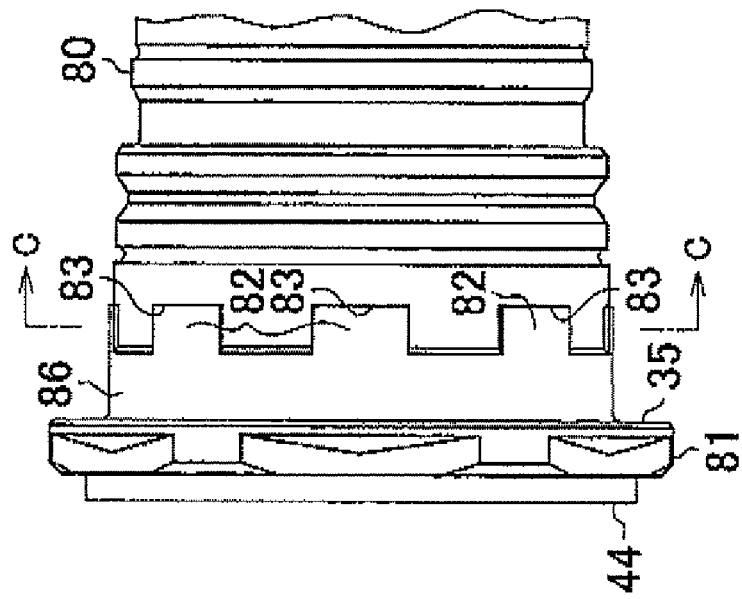

F I G. 25A
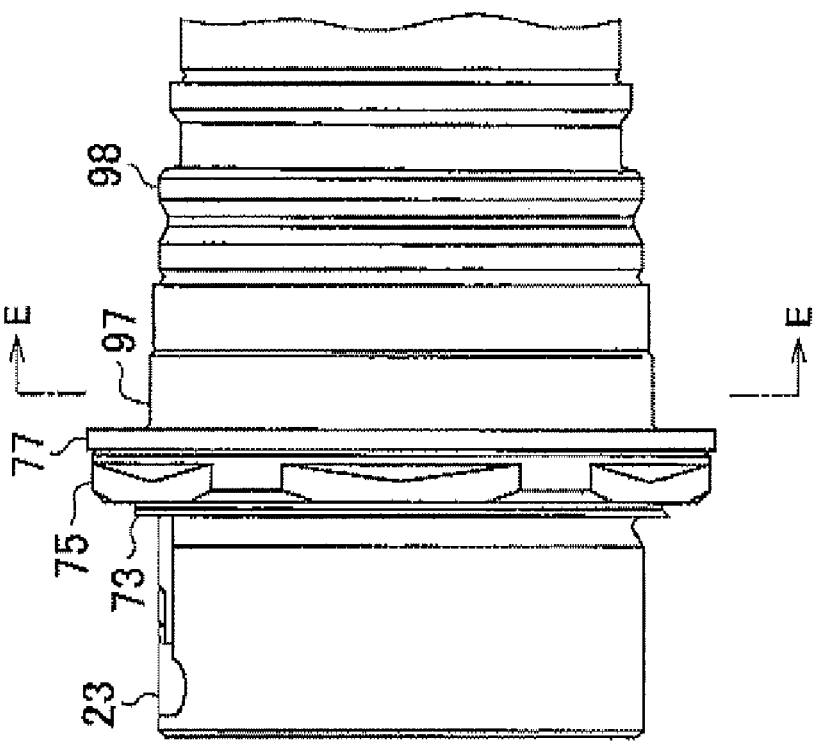
F I G. 25B
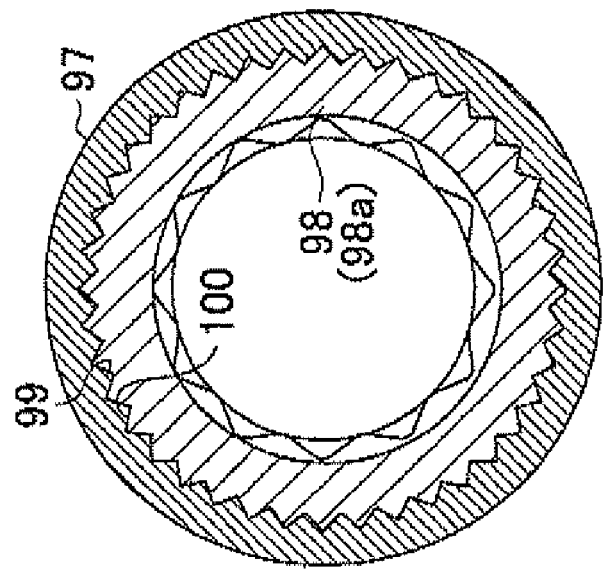

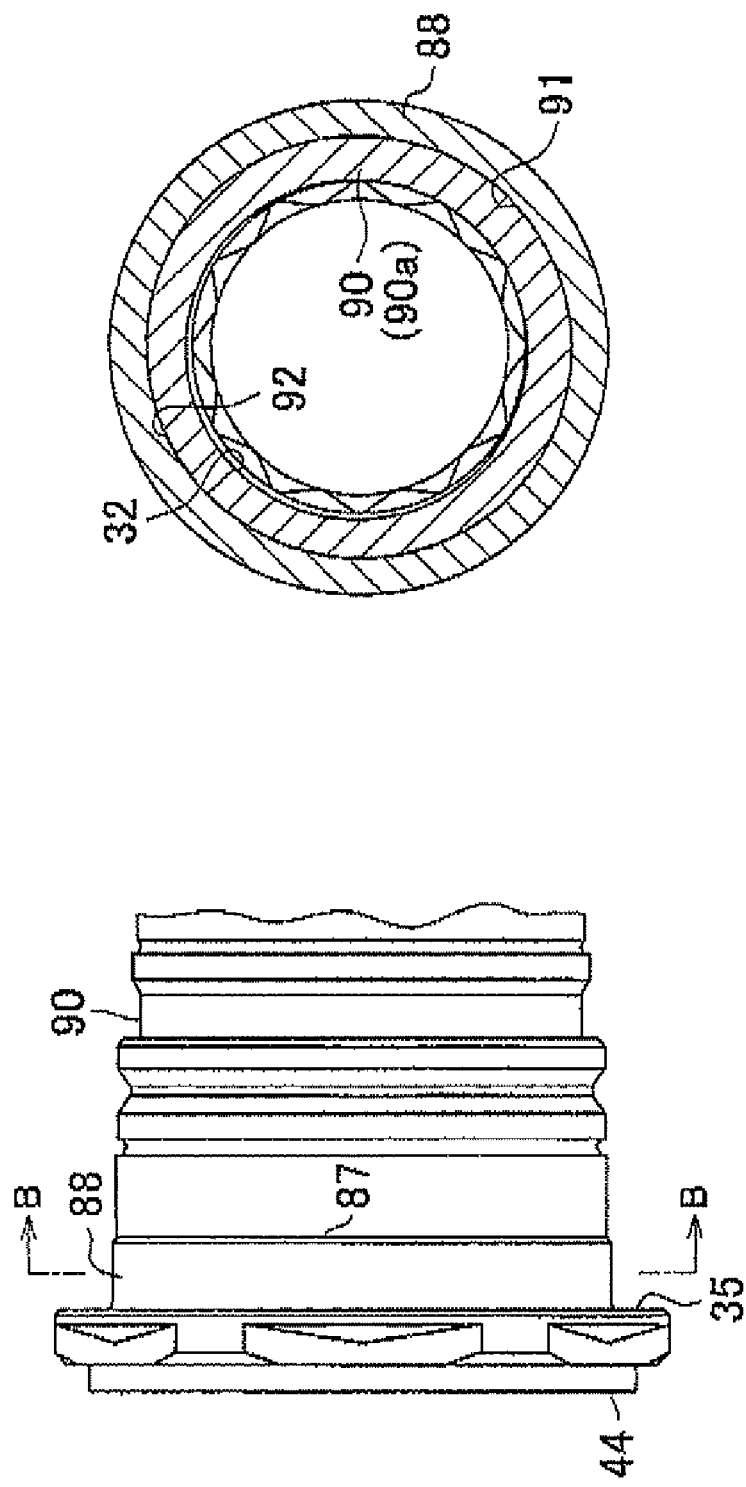

ELECTRIC POWER STEERING SYSTEM

INCORPORATION BY REFERENCE

The disclosures of Japanese Patent Application No. 2009-199786 filed on Aug. 31, 2009 and Japanese Patent Application No. 2009-278195 filed on Dec. 8, 2009, each including the specification, drawings and abstract, are incorporated herein by reference in their entireties.

BACKGROUND OF THE INVENTION

1. Field of the Invention

The invention relates to an electric power steering system that includes a ball screw device.

2. Description of the Related Art

There is a rack-assist-type electric power steering system (EPS) that converts the rotation of a motor shaft, through which a rack shaft passes and which is rotated by a motor, into axial movement of the rack shaft using a ball screw device to supply assist force to a steering system.

In the EPS described above, the ball screw device is formed by arranging a plurality of balls between a ball screw nut secured to the motor shaft and a threaded portion formed in the rack shaft. When a threaded portion formed in the inner periphery of the ball screw nut and the threaded portion formed in the outer periphery of the rack shaft face each other, a helical ball-rolling path is formed. Each ball arranged in the ball-rolling path rolls under load. Thus, the rotation of the ball screw nut is converted into axial movement of the rack shaft.

For example, Japanese Patent Application Publication No. 2006-256414 (JP-A-2006-256414) describes a structure for securing a ball screw nut to a motor shaft. According to JP-A-2006-256414, the ball screw nut is fitted into a housing recess, formed in the inner periphery of the motor shaft, in the axial direction, and the axial position of the ball screw nut is determined by a locknut. Employment of this structure makes it possible to reduce the axial length.

However, employment of the above-described structure causes an increase in the diameter of a portion of the motor shaft, at which the ball screw nut and the motor shaft overlap each other. Further, clamping the ball screw nut using the locknut may cause deformation of the ball screw nut, resulting in distortion of a thread groove that forms a ball-rolling path. The distortion hinders smooth rolling of each ball in the ball-rolling path, which may cause abnormal sound, vibration, and deterioration of steering feel.

Therefore, for example, Japanese Patent Application Publication No. 6-255501 (JP-A-6-255501) describes a structure in which flanges that extend radially outward are formed at axial ends of a ball screw nut and a motor shaft, and the flanges are fastened to each other to connect the ball screw nut and the motor shaft to each other. This structure makes it possible to secure the ball screw nut and the motor shaft to each other in such a manner that the ball screw nut and the motor shaft are not allowed to rotate relative to each other, without causing deformation of the ball screw nut.

However, in the above-described structure, the flanges need to be fastened to each other with a plurality of bolts. Fastening the flanges to each other with a plurality of bolts is cumbersome. Therefore, it is difficult to increase the productivity.

Japanese Patent Application Publication No. 2007-239782 (JP-A-2007-239782) describes a structure in which a threaded portion is formed in the outer periphery of a ball screw nut and the ball screw nut is screwed to the inner periphery of a motor shaft. Employment of this structure makes it possible to disperse stress applied to the ball screw nut to the entirety of the outer periphery of the ball screw nut. Thus, it is possible to restrict deformation of the ball screw nut and distortion of a ball-rolling path due to the deformation. In addition, it is possible to improve the work efficiency during production.

However, it is difficult to form a threaded portion in the entirety of the outer periphery of a ball screw nut that has high strength and rigidity. In addition, providing the ball screw nut in a motor shaft causes upsizing of a portion of the motor shaft at which the ball screw nut is located. Further, the motor rotational direction is frequently changed in an EPS. Therefore, the frequent change in the motor rotational direction may generate a force that loosens the ball screw nut that is screwed to the motor shaft. However, countermeasures such as using a locknut as a rotation prevention device as described in JP-A-2007-239782 and using a setscrew that radially passes through the motor shaft and the ball screw nut may cause distortion of a ball-rolling path of the ball screw nut. On this point, there is still room for improvement.

SUMMARY OF INVENTION

It is an object of the invention to provide an electric power steering system that makes it possible to secure a ball screw nut to a motor shaft without causing deformation, thereby achieving high reliability, sufficient quietness and good steering feel, and improving the working efficiency during production.

An aspect of the invention relates to an electric power steering system that includes: a rack shaft that is able to reciprocate in the axial direction; a motor shaft through which the rack shaft passes, and which is rotated by a motor; and a ball screw device that converts rotation of the motor shaft into axial movement of the rack shaft. The ball screw device is formed by securing a ball screw nut to an axial end portion of the motor shaft and arranging a plurality of balls within a helical ball-rolling path that is formed by aligning a thread groove formed in an inner periphery of the ball screw nut and a thread groove formed in an outer periphery of the rack shaft with each other. A hollow threaded shaft is formed in an axial end portion of the ball screw nut of the ball screw device, and the ball screw nut is screwed to the axial end portion of the motor shaft by screwing the threaded shaft to a threaded portion formed in the motor shaft. A restriction portion that restricts relative rotation between the ball screw nut and the motor shaft is provided.

The threaded shaft is formed in the axial end portion of the ball screw nut, and the threaded shaft is screwed to the axial end portion of the motor shaft. Thus, stress that is applied to a main portion in which a thread groove is formed is reduced, and the likelihood that the thread groove is deformed is drastically reduced. As a result, it is possible to achieve sufficient quietness and good steering feel, and to improve the work efficiency during production. In addition, it is possible to restrict loosening of the ball screw nut by restricting the relative rotation between the ball screw nut and the motor shaft using the restriction portion.

BRIEF DESCRIPTION OF DRAWINGS

The foregoing and further features and advantages of the invention will become apparent from the following description of example embodiments with reference to the accompanying drawings, wherein like numerals are used to represent like elements and wherein:

FIG. 19A is a side view showing the motor shaft to which the flange member is fitted in the first modification;

FIG. 19B is a cross-sectional view showing the motor shaft to which the flange member is fitted in the first modification, taken along the line C-C in FIG. 19A;

FIG. 25A is a side view showing the motor shaft to which a ball screw nut, the cylindrical member and a nut are fitted in the third modification;

FIG. 25B is a cross-sectional view showing the motor shaft to which the ball screw nut, the cylindrical member and the nut are fitted in the third modification, taken along the line E-E in FIG. 25A;

FIG. 34A is a side view showing the motor shaft to which the flange member is fitted in the modification of the fourth embodiment; and FIG. 34B is a cross-sectional view showing the motor shaft to which the flange member is fitted according to the modification of the fourth embodiment, taken along the line B-B in FIG. 34A.

DETAILED DESCRIPTION OF EMBODIMENTS

Figure 1:
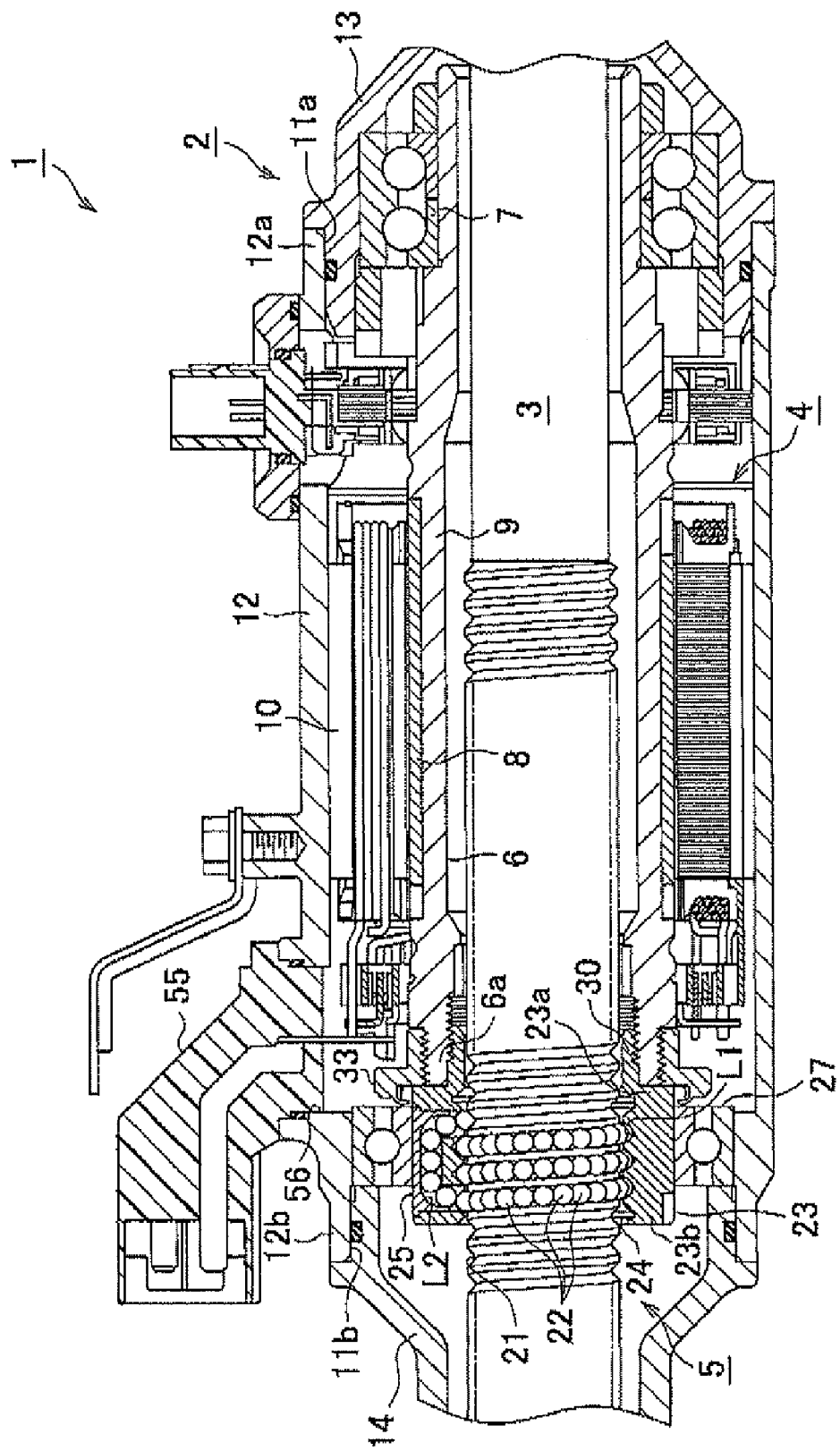
FIG. 1 is a cross-sectional view schematically showing the structure of an electric power steering system (EPS)

Hereafter, a first embodiment of the invention will be described with reference to the accompanying drawings. As shown in FIG. 1, in an electric power steering system (EPS) 1 according to the first embodiment, a rack shaft 3 that passes through a substantially cylindrical housing 2 is supported by a rack guide (not shown) and a plain bearing (not shown). Thus, the rack shaft 3 is supported and housed in the housing 2 so as to be movable along its axial direction. The rack shaft 3 is connected to a steering shaft via a known rack-and-pinion mechanism so that the rack shaft 3 reciprocates along the axial direction in response to a steering operation.

The EPS 1 includes a motor 4 that serves as a drive source, and a ball screw device 5 that converts the rotation of the motor 4 into axial movement of the rack shaft 3. The EPS 1 according to the first embodiment is formed as a rack-assist-type EPS in which the rack shaft 3, the motor 4 and the ball screw device 5, which are fitted together, are housed in the housing 2.

More specifically, the motor 4 has a motor shaft 6 that is a hollow shaft. The motor shaft 6 is supported by a bearing 7 provided on the inner periphery of the housing 2 so that the motor shaft 6 extends along the axial direction of the housing 2. In the motor 4, a motor rotor 9 is formed by fixing a magnet 8 to a peripheral face of the motor shaft 6. A motor stator 10 that surrounds the outer periphery of the motor rotor 9 is secured to the inner periphery of the housing 2 and the rack shaft 3 is passed through the motor shaft 6. Thus, the motor 4 is arranged coaxially with the rack shaft 3 in the housing 2.

The housing 2 is formed by fitting a cylindrical motor housing 12 and side housings 13 and 14 together. The motor housing 12 has openings 11a and 11b at respective axial ends thereof. The side housings 13 and 14 are fitted to axial ends 12a and 12b of the motor housing 12 to block the openings 11a and 11b, respectively.

More specifically, a rack guide is formed in the side housing 13 that is fitted to the right axial end portion 12a of the motor housing 12 as shown in FIG. 1. The rack guide supports the rack shaft 3 and forms a rack-and-pinion mechanism by pushing the rack shaft 3 against a pinion shaft (not shown). The bearing 7 that supports the motor shaft 6 is arranged in the side housing 13. When the side housing 13 is fitted to the axial end portion 12a of the motor housing 12, the motor shaft 6 is arranged on the inner side of the motor stator 10 that is formed on the inner periphery of the motor housing 12. The rack shaft 3 and the ball screw device 5 are placed into the motor housing 12 through the remaining opening among the openings 11a and 11b formed at the respective axial ends of the motor housing 12, that is, the opening 11b formed at the left axial end portion 12b of the motor housing 12 in FIG. 1.

A thread groove 21 is formed in the outer periphery of the rack shaft 3, whereby the rack shaft 3 is formed as a threaded shaft. The ball screw device 5 is formed by screwing a ball screw nut 23 to the rack shaft 3 via a plurality of balls 22.

Figure 2:
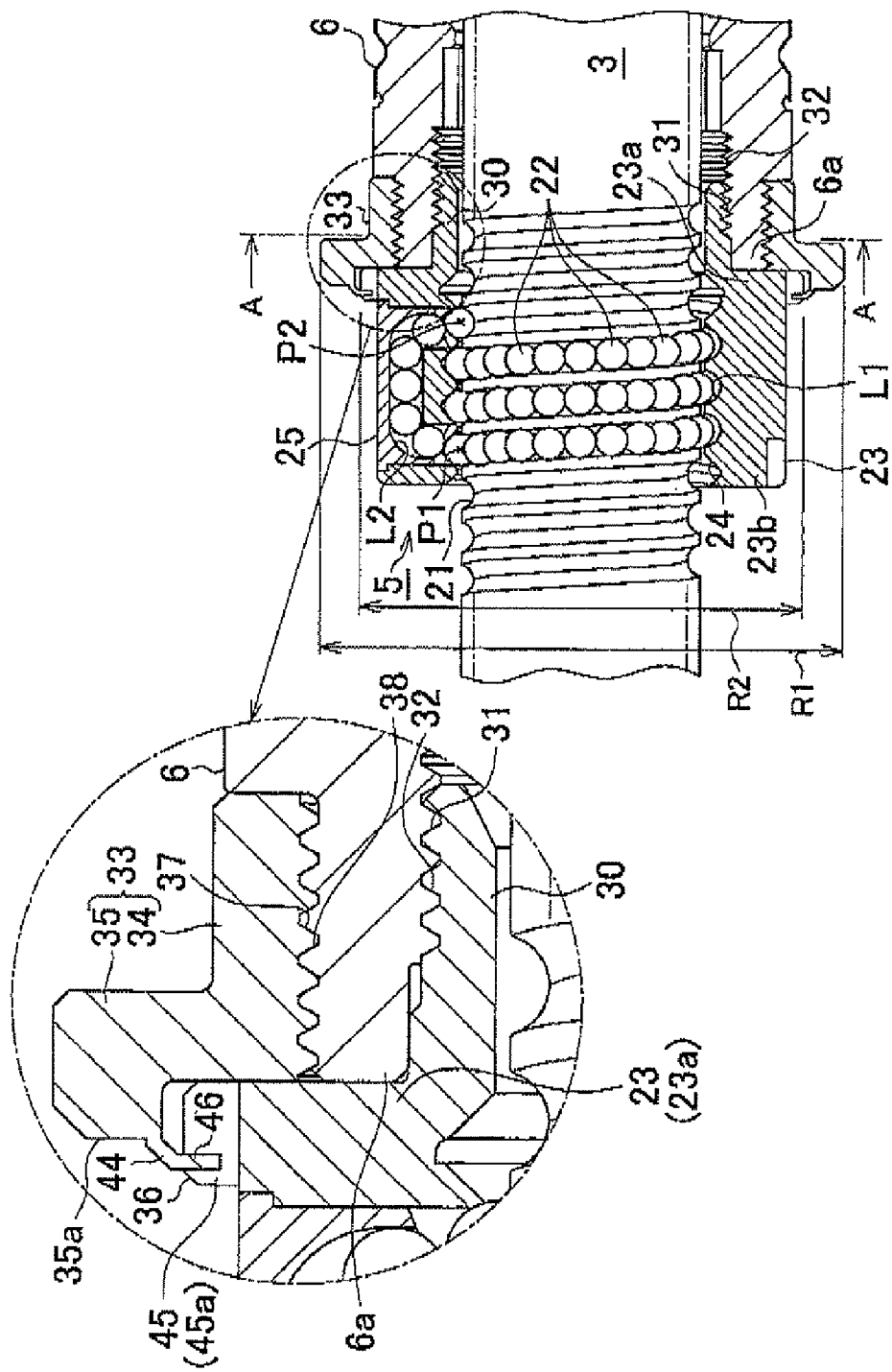
FIG. 2 is an enlarged cross-sectional view showing a ball screw device and portions near the ball screw device according to a first embodiment.

More specifically, as shown in FIG. 2, a thread groove 24 that corresponds to the thread groove 21 of the rack shaft 3 is formed in the inner periphery of the substantially cylindrical ball screw nut 23. The ball screw nut 23 is fitted to the outer periphery of the rack shaft 3 in such a manner that the thread groove 24 is aligned with the thread groove 21 of the rack shaft 3. The balls 22 are arranged in a helical ball-rolling path L1 that is formed by aligning two thread grooves 21 and 24 with each other.

A return path L2 that opens into the thread groove 24 at two positions (connection points P1 and P2) is formed in the ball screw nut 23. The return path L2 is formed by fitting a circulation member 25 to the ball screw nut 23. The circulation member 25 has a function of scooping the balls 22 up from the ball-rolling path L1 and a function of discharging the balls 22 into the ball-rolling path L1. The return path L2 serves as a short-cut between the two connection points P1 and P2 that are set in the ball-rolling path L1 and that correspond to the openings of the return path L2.

The balls 22 arranged in the ball-rolling path L1 formed between the rack shaft 3 and the ball screw nut 23 roll in the ball-rolling path L1 under load due to the rotation of the ball screw nut 23 relative to the rack shaft 3. The balls 22 that have passed through the ball-rolling path L1 pass through the return path L2 formed in the ball screw nut 23. In this way, the balls 22 move from the downstream side to the upstream side between the two connection points P1 and P2 that are set in the ball-rolling path L1. The balls 22 that roll in the ball-rolling path L1 are infinitely circulated through the return path L2, whereby the ball screw device 5 converts the rotation of the ball screw nut 23 into the axial movement of the rack shaft 3.

In the first embodiment, the ball screw nut 23 is connected to an axial end portion 6a of the motor shaft 6, and the rotation of the motor 4 that is the drive source is input in the ball screw device 5 when the ball screw nut 23 rotates together with the motor shaft 6. As shown in FIG. 1, a ball bearing 27 is arranged between the ball screw nut 23 and the housing 2 (motor housing 12) that houses the ball screw nut 23. The EPS 1 converts the motor torque into a pushing force that is applied in the axial direction of the rack shaft 3, and applies the pushing force to a steering system as an assist force for assisting a steering operation.

Next, a structure for securing the ball screw nut in the EPS according to the first embodiment will be described.

Figure 3:
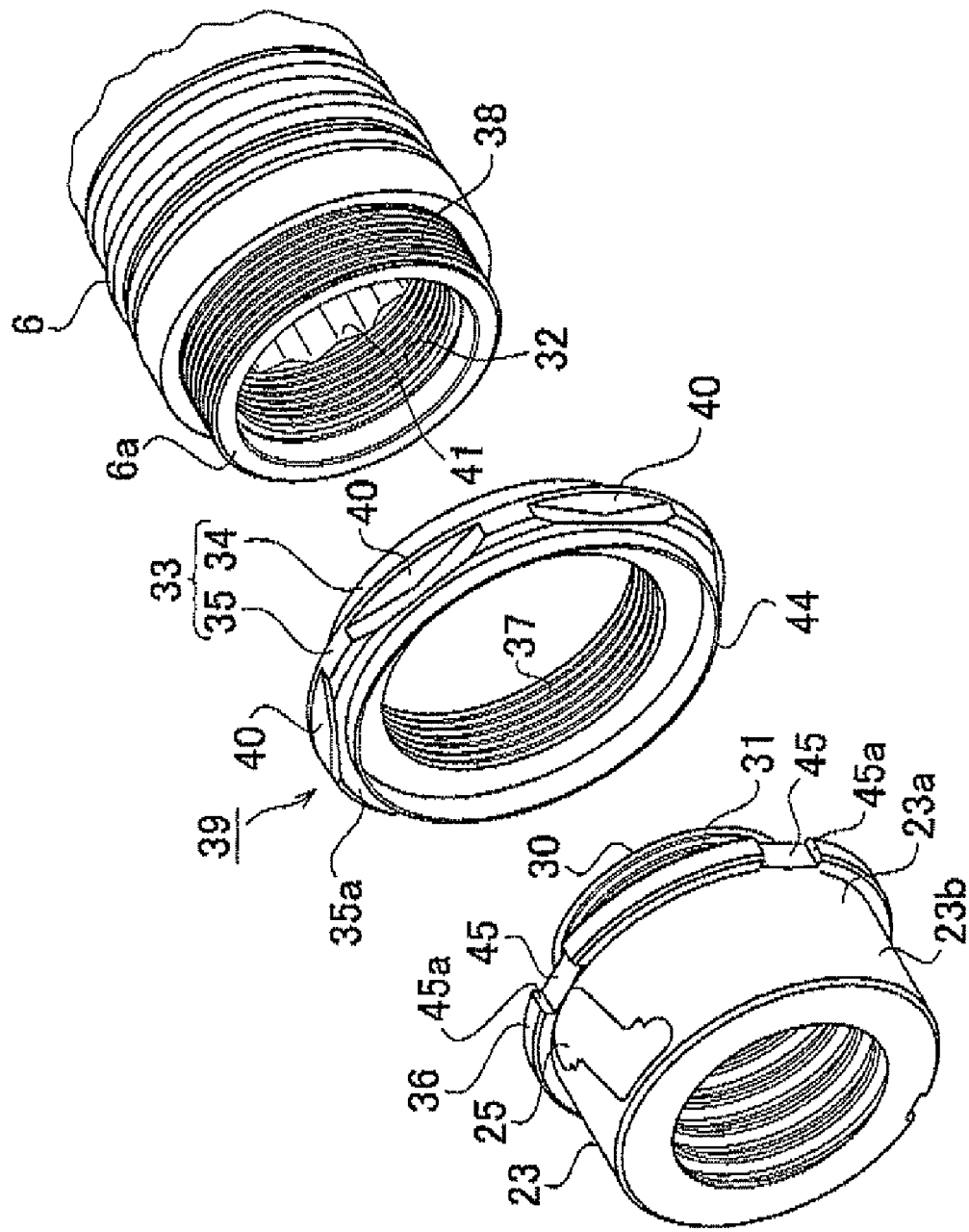
FIG. 3 is a perspective view showing a ball screw nut, a motor shaft and a flange member according to the first embodiment.
Figure 4:
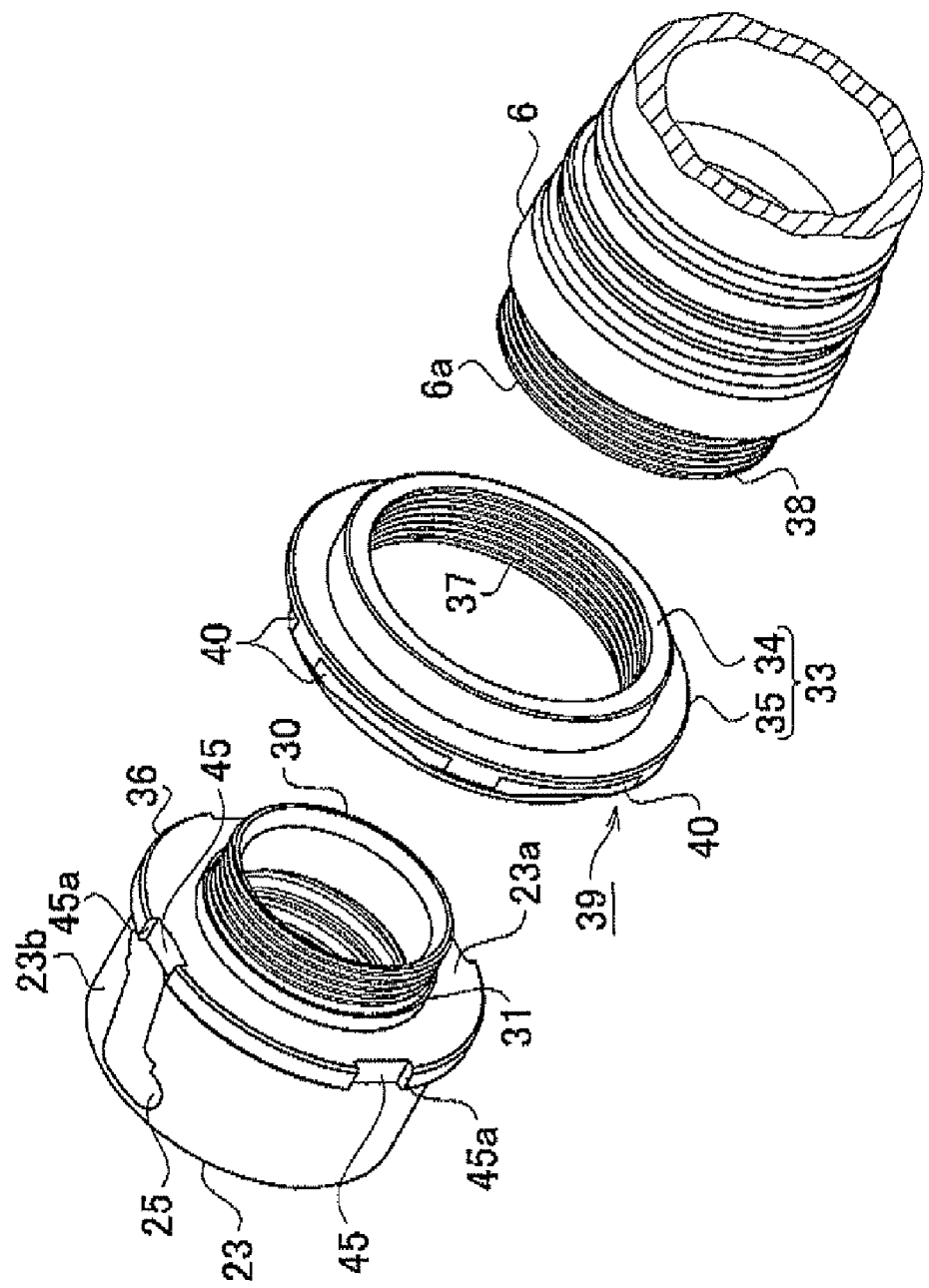
FIG. 4 is a perspective view showing the ball screw nut, the motor shaft and the flange member according to the first embodiment.

As shown in FIGS. 2 to 4, a hollow threaded shaft 30 that extends in the axial direction is formed at an axial end portion 23a (right end portion in FIG. 2) of the ball screw nut 23. A threaded portion 32 is formed in the inner periphery of the motor shaft 6. The threaded portion 32 corresponds to a threaded portion 31 that is formed in the outer periphery of the threaded shaft 30. When the threaded portion 31 of the threaded shaft 30 formed at the axial end portion 23a of the ball screw nut 23 is screwed to the threaded portion 32 formed in the inner periphery of the motor shaft 6, the ball screw nut 23 is secured to the axial end portion 6a of the motor shaft 6.

A flange member 33 is fitted to the outer periphery of the motor shaft 6, more specifically, the outer periphery of the axial end portion 6a of the motor shaft 6. The flange member 33 is larger in diameter than the ball screw nut 23. By restricting the rotation of the flange member 33, it is possible to restrict simultaneous rotation of the ball screw nut 23 and the motor shaft 6 in the same direction when the ball screw nut 23 is screwed to the motor shaft 6.

When the ball screw nut 23 is screwed to the axial end portion 6a of the rotatably supported motor shaft 6 in the axial direction, it is necessary to restrict the simultaneous rotation of the motor shaft 6 and the ball screw nut 23 in the same direction (restrict the motor shaft 6 and the ball screw nut 23 from rotating together with each other). In the first embodiment, it is possible to restrict the motor shaft 6 from rotating together with the ball screw nut 23 by holding the flange member 33 fitted to the motor shaft 6 at a predetermined position in the motor housing 12. Thus, it is possible to easily and reliably screw the ball screw nut 23 to the motor shaft 6.

More specifically, the flange member 33 has a cylindrical base portion 34 and a rib portion 35 that extends radially outward from the outer periphery of the base portion 34. A flange portion 36 that extends radially outward is formed at the axial end portion 23a of the ball screw nut 23. An outer diameter R1 of the rib portion 35 of the flange member 33 is larger than an outer diameter R2 of the flange portion 36 of the ball screw nut 23 (see FIG. 2: R1>R2). Thus, the outer peripheral edge of the rib portion 35 is located further radially outward than the outer peripheral edge of the flange portion 36 of the ball screw nut 23.

A threaded portion 37 is formed in the inner periphery of the base portion 34 of the flange member 33, and a threaded portion 38 is formed in the outer periphery of the axial end portion 6a of the motor shaft 6. When the threaded portion 37 formed in the base portion 34 is screwed to the threaded portion 38 of the motor shaft 6, the flange member 33 is screwed to the outer periphery of the axial end portion 6a of the motor shaft 6.

The threaded portions 37 and 38 are formed in such a manner that the screw direction of the threaded portions 37 and 38 is opposite to the screw direction of the threaded portion 31 formed in the threaded shaft 30 and the threaded portion 32 formed in the inner periphery of the motor shaft 6, that is, the rotational direction when the threaded portions 37 and 38 are screwed to each other is opposite to the rotational direction when the threaded portions 31 and 32 are screwed to each other. More specifically, the threaded portions 31 and 32 used to screw the ball screw nut 23 to the motor shaft 6 are right-hand threads, whereas the threaded portions 37 and 38 used to screw the flange member 33 to the motor shaft 6 are left-hand threads.

The screw direction of the threaded portions 31 and 32 used to screw the ball screw nut 23 to the motor shaft 6 is opposite to the screw direction of the threaded portions 37 and 38 used to screw the flange member 33 to the motor shaft 6. With this arrangement, when one of the ball screw nut 23 and the flange member 33 is loosened by the rotation relative to the motor shaft 6, the other of the ball screw nut 23 and the flange member 33 is tightened.

When the ball screw nut 23 is screwed to the motor shaft 6, the motor shaft 6 attempts to rotate in the same direction as the ball screw nut 23. However, the direction in which the motor shaft 6 attempts to rotate together with the ball screw nut 23 is the direction in which the motor shaft 6 is more tightly screwed to the flange member 33. Accordingly, if the rotation of the flange member 33 is restricted by, for example, a jig, it is possible to restrict the rotation of the motor shaft 6 together with the ball screw nut 23 when the ball screw nut 23 is screwed to the motor shaft 6. By holding the rib portion 35 of the flange member 33 which projects radially outward from the outer periphery of the ball screw nut 23, it is possible to restrict the motor shaft 6 from rotating together with the ball screw nut 23 when the ball screw nut 23 is screwed to the motor shaft 6.

More specifically, as shown in FIGS. 3 and 4, an engaged portion 39 is formed in the rib portion 35 of the flange member 33, which is larger in diameter than the ball screw nut 23. When the engaged portion 39 is engaged with a restricting member, for example, a jig or a tool, the rotation of the flange member 33 is restricted.

Figure 5:
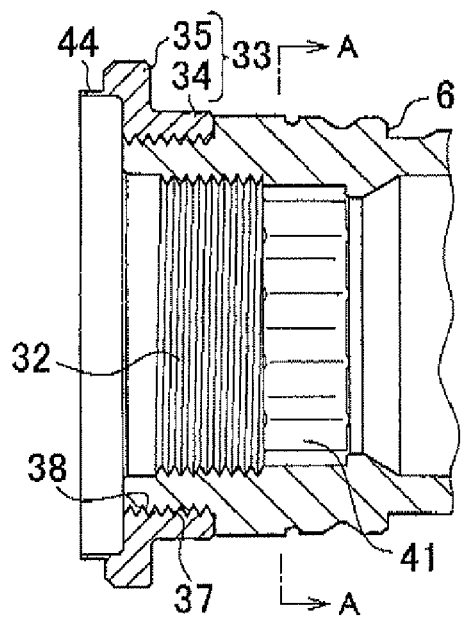
FIG. 5 is a cross-sectional view showing the motor shaft to which the flange member is fitted (screwed)

The engaged portion 39 is formed by forming multiple (six in the first embodiment) recesses 40 in the peripheral edge portion of the face of the rib portion 35, which is proximal to the ball screw nut 23 that is to be screwed to the motor shaft 6 (screw-side face 35a located on the left side in FIG. 5). The engaged portion 39 is formed in such a shape that a polygonal cylindrical jig (for example, a hexagonal cylindrical jig) may be engaged with engaged portion 39. This shape is achieved by forming the recesses 40 in the peripheral edge portion of the screw-side face 35a at regular intervals in the circumferential direction. When the ball screw nut 23 is screwed to the motor shaft 6, the jig is engaged with the engaged portion 39 from the axial direction to restrict the motor shaft 6 from rotating together with the ball screw nut 23. In this state, the ball screw nut 23 is inserted from the inside of the jig. As a result, it is possible to easily and reliably screw the ball screw nut 23 to the axial end portion 6a of the motor shaft 6.

Figure 6A:
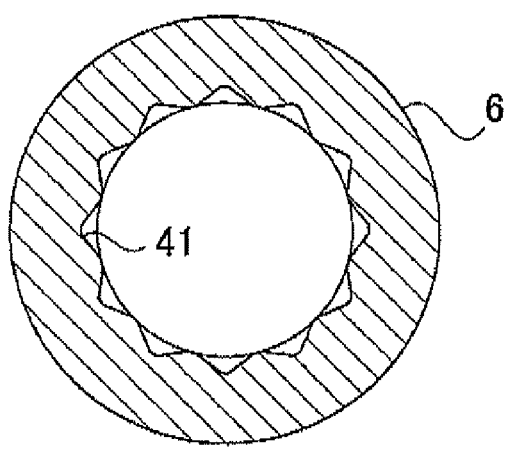
FIG. 6A is a cross-sectional view taken along the line A-A in FIG. 5.

In addition, an engaged portion 41 is formed in the inner periphery of the motor shaft 6. When the engaged portion 41 is engaged with a restricting member, for example, a jig or a tool, the rotation of the motor shaft 6 is restricted. More specifically, the engaged portion 41 is formed in a portion of the inner periphery, which is further axially inward (right side in FIG. 5) than the threaded portion 32 used to screw the ball screw nut 23 to the motor shaft 6. As shown in FIG. 6A, the engaged portion 41 is formed by forming a plurality (twelve in the first embodiment) of triangular grooves, extending in the axial direction, at regular intervals in the circumferential direction. When the flange member 33 is screwed to the motor shaft 6, a polygonal columnar (polygonal cylindrical) jig (for example, hexagonal cylindrical jig) is inserted into the motor shaft 6 and engaged with the engaged portion 41. As a result, it is possible to restrict the rotation of the motor shaft 6 to restrict the motor shaft 6 from rotating together with the ball screw nut 23.

Also, the flange member 33 serves as a restriction portion that restricts relative rotation between the motor shaft 6 and the ball screw nut 23 that is screwed to the axial end portion 6a of the motor shaft 6.

More specifically, as shown in FIGS. 2 to 5, the flange member 33 that is fitted to the axial end portion 6a of the motor shaft 6 has a thin-plate portion 44 that is positioned on the radially outer side of the ball screw nut 23. The thin-plate portion 44 according to the first embodiment extends in the axial direction from the screw-side face 35a of the rib portion 35 of the flange member 33 toward the ball screw nut 23 that is to be screwed to the motor shaft 6 (left side in FIGS. 2 and 5). The thin-plate portion 44 is formed in an annular shape so as to surround a portion of the outer periphery of the ball screw nut 23, more specifically, the flange portion 36 that is formed at the axial end portion of the ball screw nut 23. Multiple (four in the first embodiment) cutouts 45 are formed in the flange portion 36 of the ball screw nut 23. The cutouts 45 are formed at regular intervals in the circumferential direction. The thin-plate portion 44 of the flange member 33 is pressed from radially outer side to be swaged into the cutouts 45. Thus, the relative rotation between the ball screw nut 23 and the flange member 33, that is, the relative rotation between the ball screw nut 23 and the motor shaft 6 is restricted.

Figure 6B:
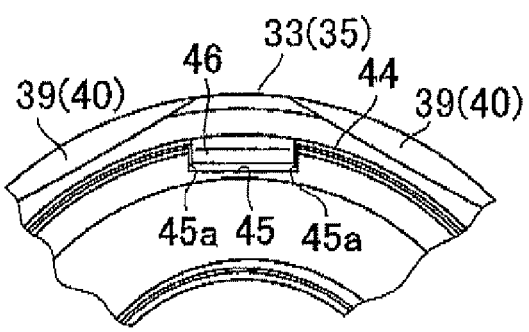
FIG. 6B is a front view showing the state where a thin-plate portion of the flange member is swaged into a cutout formed in a flange portion of the ball screw nut.

When the thin-plate portion 44 is folded into the cutouts 45 through a swaging process, the thin-plate portion 44 is cut along side faces 45a of the cutouts 45 as shown in FIG. 6B. Then, engagement pieces 46 formed by cutting the thin-plate portion 44 are engaged in the cutouts 45. In this way, the thin-plate portion 44 is more firmly swaged into the cutouts 45 so that the relative rotation between the ball screw nut 23 and the motor shaft 6 is restricted more reliably.

Next, description will be provided concerning a work procedure that is taken when the ball screw nut 23 is secured (screwed) to the motor shaft 6 in the EPS 1 structured as described above according to the first embodiment.

As described above, the motor shaft 6 is supported by the bearing 7 fitted to the side housing 13 that blocks the opening 11a from among the openings 11a and 11b formed at the respective axial ends of the motor housing 2. Thus, the motor shaft 6 is rotatably arranged in the motor housing 12 (see FIG. 1). Therefore, the ball screw nut 23 is inserted into the motor housing 12 together with the rack shaft 3 through the remaining opening 11b of the motor housing 12, and screwed and secured to the axial end portion 6a of the motor shaft 6.

Figure 7:
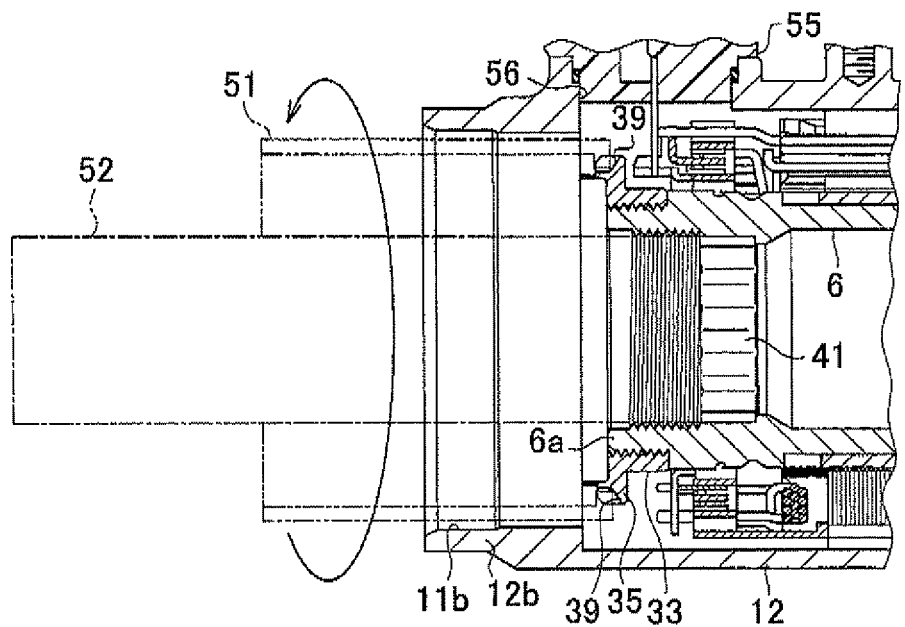
FIG. 7 is a view illustrating a work procedure that is taken when the ball screw nut is secured (screwed) to the motor shaft.

More specifically, as shown in FIG. 7, a step of screwing the flange member 33 to the outer periphery of the motor shaft 6 is performed before the ball screw nut 23 is screwed to the motor shaft 6.

At this time, a polygonal (hexagonal in the first embodiment) cylindrical jig 51 is engaged with the engaged portion 39 formed in the rib portion 35 of the flange member 33. A polygonal (hexagonal in the first embodiment) columnar jig 52 is engaged with the engaged portion 41 formed in the inner periphery of the motor shaft 6. Then, the flange member 33 is screwed to the motor shaft 6 by rotating the jig 51 engaged with the engaged portion 39 of the flange member 33 while rotation of the motor shaft 6 is restricted by the jig 52 that is engaged with the engaged portion 41 of the motor shaft 6.

Figure 8:
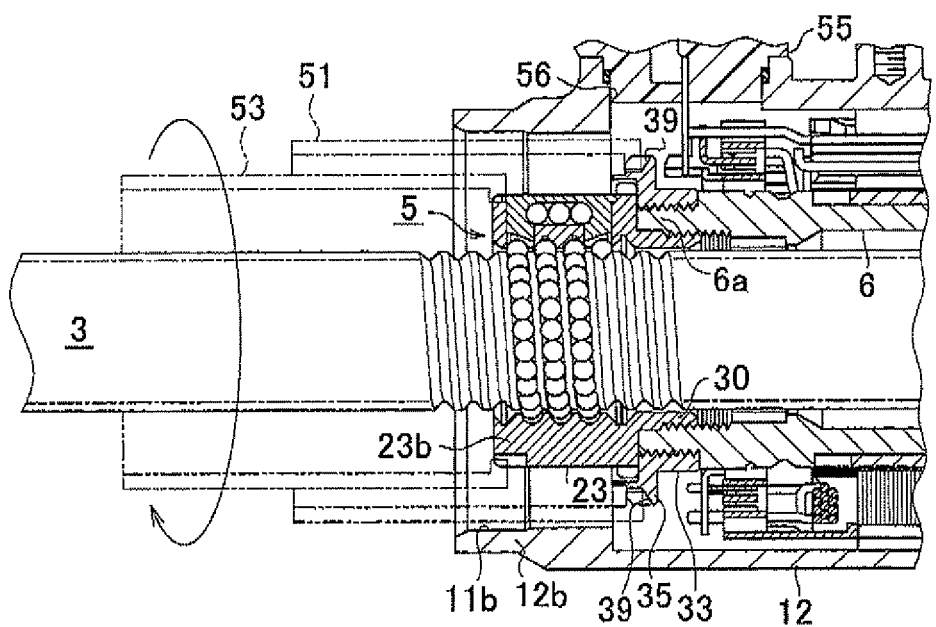
FIG. 8 is a view illustrating a work procedure that is taken when the ball screw nut is secured (screwed) to the motor shaft.

After the step of screwing the flange member 33 to the motor shaft 6 is completed, the jig 52 is removed through the opening 11b of the motor housing 12. Then, as shown in FIG. 8, after the rack shaft 3 is inserted into the motor shaft 6, a step of screwing the ball screw nut 23 to the axial end portion 6a is performed.

In this step, a jig 53 is inserted into the jig 51 and an axial end portion 23b of the ball screw nut 23 (a left side end portion in FIG. 8: an end portion that is close to the opening 11b) is held by the jig 53. Thus, the ball screw nut 23 can be rotated. The ball screw nut 23 is screwed to the motor shaft 6 by rotating the jig 53 that holds the axial end portion 23b of the ball screw nut 23 while the rotation of the flange member 33 is restricted by the jig 51 engaged with the engaged portion 39 of the flange member 33 to restrict the motor shaft 6 from rotating together with the ball screw nut 23.

After the step of screwing the ball screw nut 23 to the motor shaft 6 is completed, a step of swaging the thin-plate portion 44 of the flange member 33 is performed. More specifically, the jigs 51 and 53 used in the step of screwing the ball screw nut 23 are removed through the opening 11b of the motor housing 12, and a tool is inserted into the motor housing 12 through the opening 11b. Then, the thin-plate portion 44 is swaged into the cutouts 45. As a result, the ball screw nut 23 is secured to the motor shaft 6 in such a manner that the ball screw nut 23 is not allowed to rotate relative to the motor shaft 6.

As shown in FIG. 1, a fitting hole 56 used to fit a feeding connector 55 for supplying drive current to the motor 4 is formed in the motor housing 12. The inside of the motor housing 12 can be seen through the fitting hole 56. Because the flange member 33 is fitted to the axial end portion 6a of the motor shaft 6, the flange member 33 is arranged at a position that corresponds to the fitting hole 56.

In each of the above-described steps of securing the ball screw nut 23 to the motor shaft 6, whether the jig 52 is properly engaged with the engaged portion 39 of the flange member 33 can be visually checked through the fitting hole 56. Similarly, whether the thin-plate portion 44 of the flange member 33 is properly swaged into the cutouts 45 can be visually checked through the fitting hole 56. Because whether the jig 52 is properly engaged with the engaged portion 39 and whether the thin-plate portion 44 is properly swaged into the cutouts 45 can be visually checked through the fitting hole 56, it is possible to easily and reliably secure the ball screw nut 23 to the motor shaft 6.

As described above, the ball bearing 27 is arranged between the ball screw nut 23 housed in the motor housing 12 in the above-described manner and the motor housing 12 as shown in FIG. 1. After the step of securing the ball screw nut 23 to the axial end portion 6a of the motor shaft 6 is completed, the ball bearing 27 is inserted into the motor housing 12 through the opening 11b as in the case of the ball screw nut 23. When the side housing 14 that serves as the second housing is fitted to the axial end portion 12b of the motor housing 12 that serves as the first housing, the opening 11b of the motor housing 12, which is used in each step, is blocked by the side housing 14.

Figure 9:
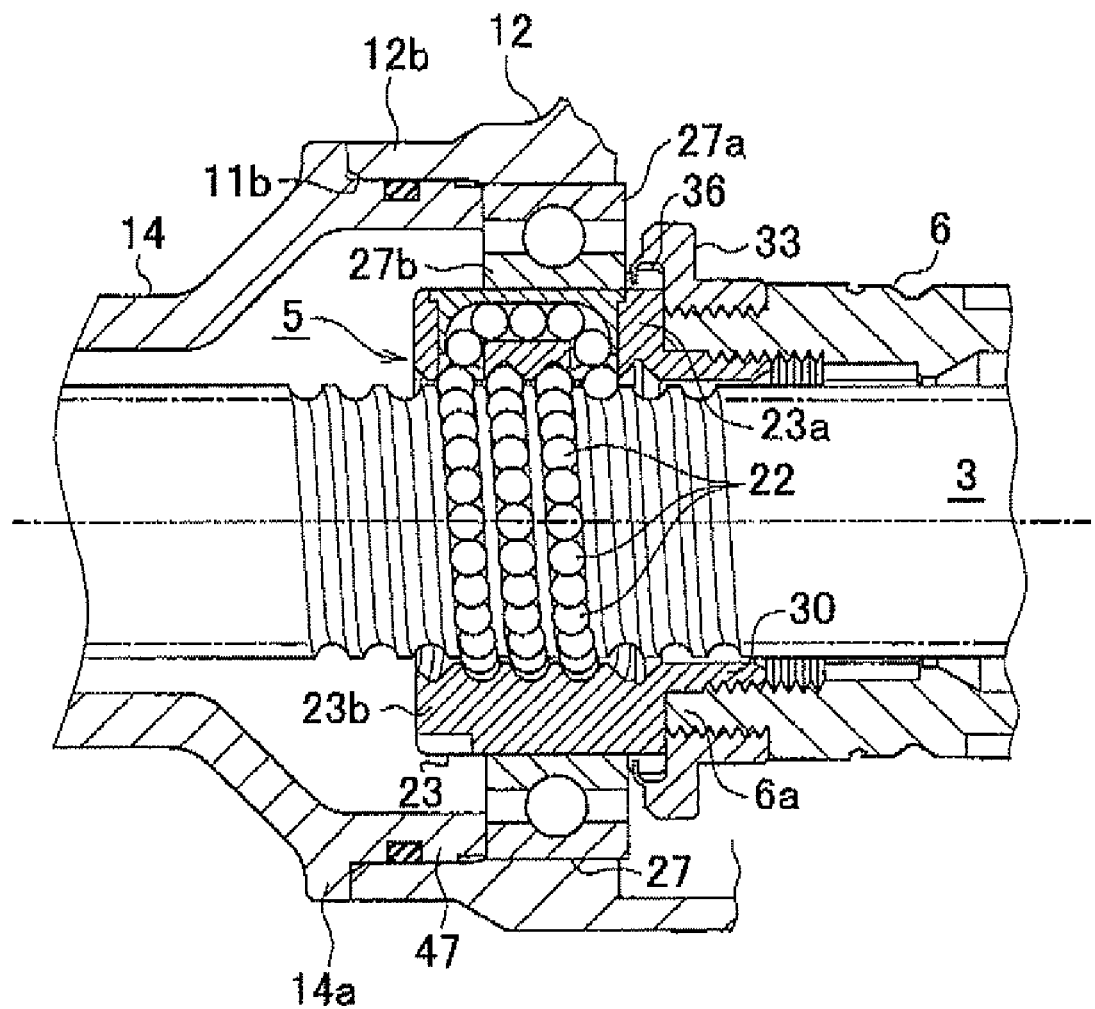
FIG. 9 is an enlarged cross-sectional view showing the ball screw nut and portions near the ball screw nut.

As shown in FIG. 9, an inserted portion 47 is formed at a secured end 14a of the side housing 14. The inserted portion 47 is placed in the motor housing 12 when the side housing 14 is fitted to the motor housing 12. The inserted portion 47 is formed in a substantially cylindrical shape, and has an outer diameter substantially equal to the inner diameter of the motor housing 12. The inserted portion 47 of the side housing 14 and the flange portion 36 of the ball screw nut 23 contact the respective axial end faces of the ball bearing 27.

More specifically, the inserted portion 47 of the side housing 14 contacts an outer ring 27a of the ball bearing 27, more specifically, an axial end face of the outer ring 27a, which is on the opening 11b-side (left side in FIG. 9). In addition, the flange portion 36 of the ball screw nut 23 contacts an inner ring 27b of the ball bearing 27, more specifically, the axial end face of the inner ring 27b, which is on the motor shaft 6-side (right side in FIG. 9). It is possible to restrict the axial movement of the ball screw nut 23 toward the opening 11b, that is, the movement of the ball screw nut 23 relative to the motor shaft 6 in the direction away from the motor shaft 6. In this way, the ball screw nut 23 is prevented from slipping off the motor shaft 6.

According to the first embodiment, the following effects are obtained.

1) When the threaded portion 31 of the hollow threaded shaft 30 formed in the axial end portion 23a of the ball screw nut 23 is screwed to the threaded portion 32 formed in the inner periphery of the motor shaft 6, the ball screw nut 23 is screwed to the axial end portion 6a of the motor shaft 6. The multiple cutouts 45 are formed in the flange portion 36 formed at the axial end portion 23a of the ball screw nut 23. In addition, the thin-plate portion 44, which is arranged on the radially outer side of the ball screw nut 23, is formed on the flange member 33 that is fitted to the axial end portion 6a of the motor shaft 6. The thin-plate portion 44 is swaged into the cutouts 45 that serve as engagement recesses and that have side walls in the circumferential direction. As a result, the rotation of the ball screw nut 23 relative to the motor shaft 6 is restricted.

With the simple structure described above, relative rotation between the motor shaft 6 and the ball screw nut 23 is restricted easily and reliably. As a result, it is possible to restrict loosening of the ball screw nut 23.

2) The thin-plate portion 44 extends in the axial direction, and is formed as an annular member that surrounds the outer periphery of the flange portion 36 of the ball screw nut 23.

With the structure described above, it is possible to easily swage the thin-plate portion 44 into the cutouts 45 of the ball screw nut 23 screwed to the motor shaft 6, regardless of the circumferential positions of the cutouts 45 formed in the flange portion 36. As a result, it is possible to improve the work efficiency during production.

3) When the thin-plate portion 44 is folded into the cutouts 45 through a swaging process, the thin-plate portion 44 is cut along the side faces 45a that are the side walls of the cutouts 45. Then, the engagement pieces 46 formed by cutting the thin-plate portion 44 are engaged in the cutouts 45.

With the structure described above, the engagement pieces 46 are not easily removed from the corresponding cutouts 45. As a result, the engagement pieces 46 are swaged into the cutouts 45 more firmly than when portions of the thin-plate portion 44 are elastically deformed so as to project into the cutouts 45. Because the cut faces of the engagement pieces 46 are engaged with the side faces 45a of the cutouts 45, load generated by relative rotation between the ball screw nut 23 and the motor shaft 6 is applied to the engagement pieces 46 in the width direction of the engagement pieces 46 (circumferential direction of the thin-plate portion 44). Accordingly, it is possible to more effectively restrict relative rotation between the ball screw nut 23 and the motor shaft 6. As a result, it is possible to more reliably restrict loosening of the ball screw nut 23.

4) The thin-plate portion 44 is formed on the flange member 33 that is fitted to the outer periphery of the axial end portion 6a of the motor shaft 6. Then, the flange member 33 is screwed coaxially to the motor shaft 6 in such a manner that the screw direction of the flange member 33 is opposite to the screw direction of the ball screw nut 23.

It is difficult to form the thin-plate portion 44 and the motor shaft 6 integrally with each other. This is because the thin-plate portion 44 is required to be elastically deformed relatively easily and the motor shaft 6 is required to have high strength. However, the flange member 33 is not required to have strength as high as that of the motor shaft 6. Therefore, if the thin-plate portion 44 is formed on the flange member 33 as in the above-described structure, the thin-plate portion 44 is easily formed. The flange member 33 is screwed to the motor shaft 6 in such a manner that the screw direction of the flange member 33 is opposite to that of the ball screw nut 23. Therefore, the thin-plate portion 44 formed integrally with the flange member 33 cannot rotate in such a direction that the ball screw nut 23 is loosened. Accordingly, with the above-described structure, it is possible to improve the work efficiency during production while restricting loosening of the ball screw nut 23.

5) The ball bearing 27 is arranged between the ball screw nut 23 and the motor housing 12 that houses the ball screw nut 23. The opening 11b of the motor housing 12 is blocked by the side housing 14 that is fitted to the axial end portion 12b of the motor housing 12. The inserted portion 47 is formed at the secured end 14a of the side housing 14. The inserted portion 47 is placed in the motor housing 12 when the side housing 14 is fitted to the motor housing 12. The inserted portion 47 of the side housing 14 and the flange portion 36 of the ball screw nut 23 contact the respective axial end faces of the ball bearing 27.

With the structure described above, it is possible to restrict the movement of the ball screw nut 23 relative to the motor shaft 6 in the direction away from the motor shaft 6. As a result, it is possible to prevent the ball screw nut 23 from slipping off the motor shaft 6, thereby ensuring high reliability.

6) The fitting hole 56 used to fit the feed connector 55 for supplying drive current to the motor 4 is formed in the motor housing 12. When the flange member 33 is fitted to the motor shaft 6, the flange member 33 is located at a position that corresponds to the fitting hole 56.

With the structure described above, the flange member 33 is seen through the fitting hole 56. Thus, it is possible to visually check whether the thin-plate portion 44 of the flange member 33, which constitutes the restriction portion, is properly swaged into the cutouts 45. As a result, it is possible to easily and reliably restrict loosening of the ball screw nut 23.

Hereafter, a second embodiment of the invention will be described with reference to the accompanying drawings. For convenience of explanation, the same portions as those in the first embodiment will be denoted by the same reference numerals as those in the first embodiment, and description thereof will not be provided below.

Figure 10:
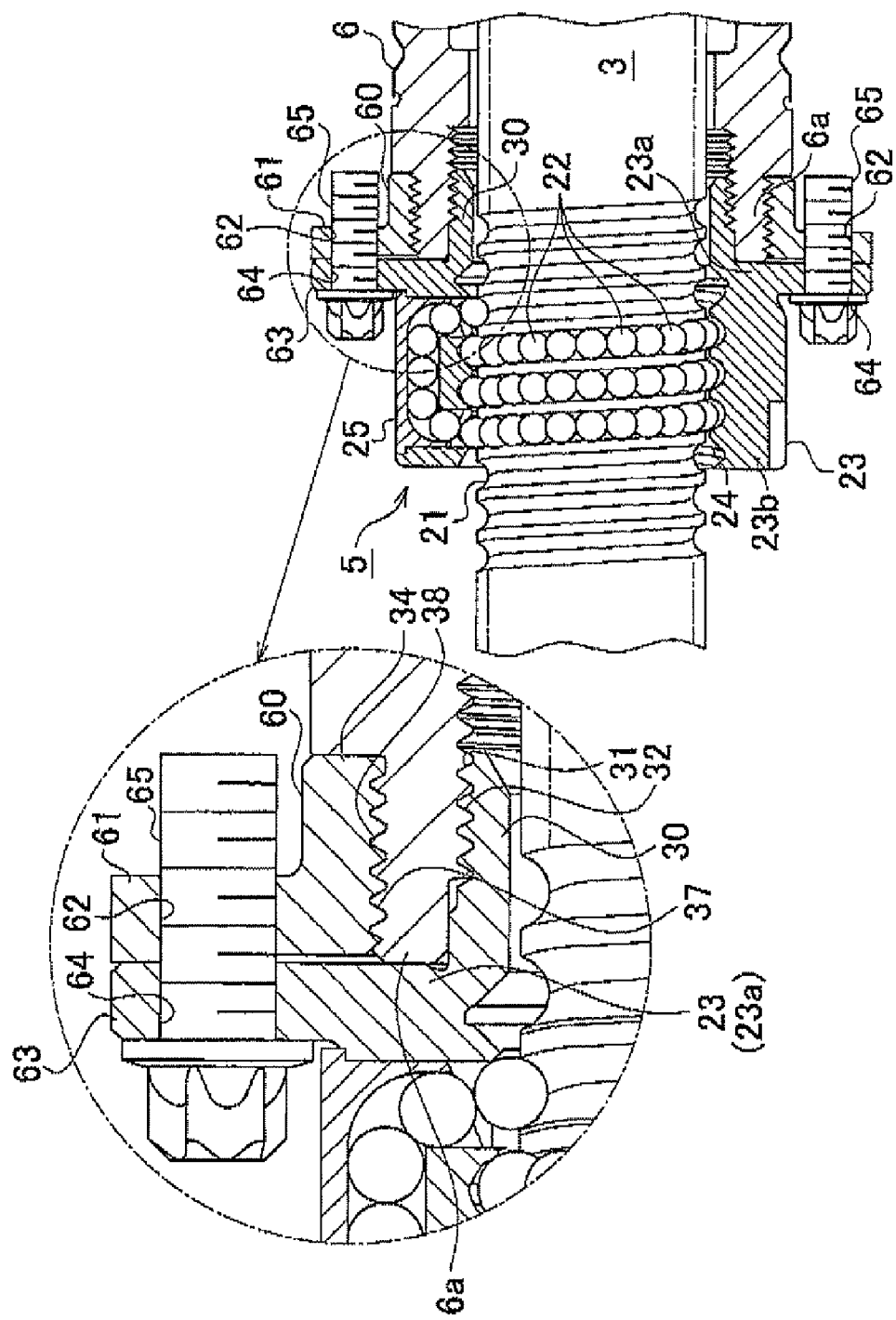
FIG. 10 is an enlarged cross-sectional view showing a ball screw device and portions near the ball screw device according to a second embodiment.
Figure 11:
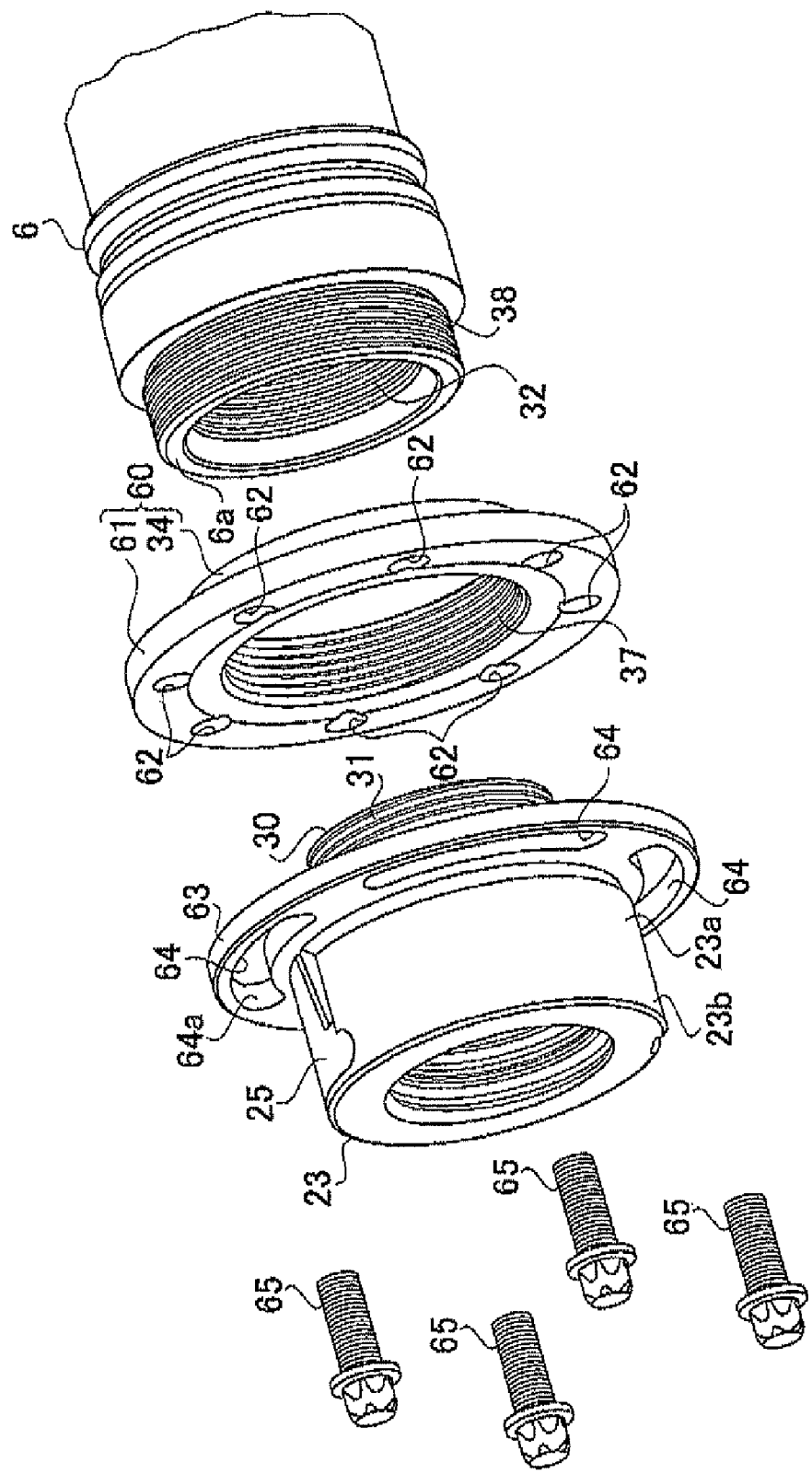
FIG. 11 is a perspective view showing a ball screw nut, a motor shaft, a flange member and columnar members (bolts) according to the second embodiment.
Figure 12:
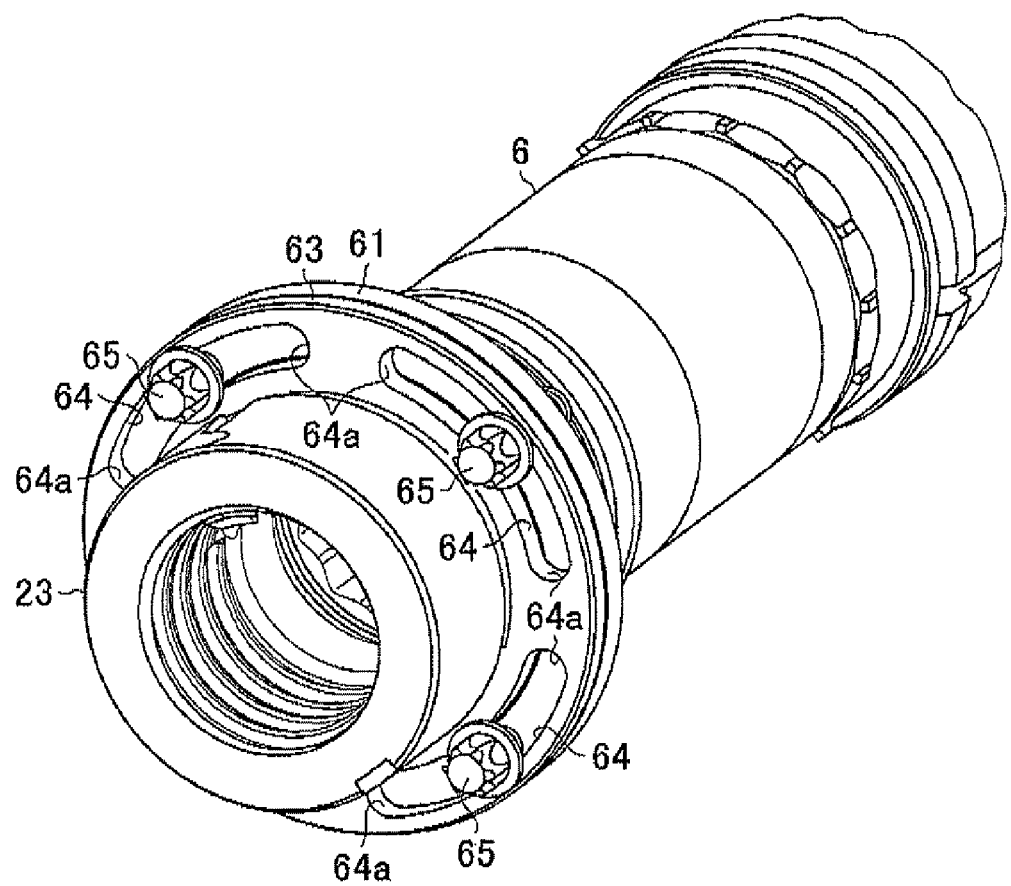
FIG. 12 is a perspective view showing the motor shaft to which the ball screw nut, the flange member and the bolts are fitted.

As shown in FIGS. 10 to 12, in the second embodiment, a flange member 60 is screwed to the outer periphery of the axial end portion 6a of the motor shaft 6 in such a manner that the screw direction of the flange member 60 is opposite to the screw direction of the ball screw nut 23. In a flange (rib) portion 61 of the flange member 60, multiple screw holes 62 are formed. In addition, multiple through-holes 64 are formed in a flange portion 63 that is formed at the axial end portion 23a of the ball screw nut 23 so as to face the flange portion 61 located on the motor shaft 6-side. The flange portion 61 located on the motor shaft 6-side and the flange portion 63 of the ball screw nut 23 are substantially the same in outer diameter. Multiple bolts 65 passed through the through-holes 64 formed in the flange portion 63 of the ball screw nut 23 are screwed into the screw holes 62 formed in the flange portion 61 located on the motor shaft 6-side.

The bolts 65 that are columnar members screwed into the screw holes 62 of the flange portion 61 located on the motor shaft 6-side constitute first engagement portions that extend in the axial direction. The through-holes 64 formed in the flange portion 63 of the ball screw nut 23 constitute second engagement portions in which the first engagement portions are engaged. If relative displacement between the motor shaft 6 and the ball screw nut 23 in the circumferential direction is caused, the relative rotation between the motor shaft 6 and the ball screw nut 23 is restricted because the bolts 65 that are the columnar members that constitute the first engagement portions are engaged with side walls 64a of the through-holes 64 that constitute the second engagement portions. Consequently, it is possible to prevent the ball screw nut 23 from slipping off the motor shaft 6.

More specifically, in the flange portion 61 located on the motor shaft 6-side, eight screw holes 62 are formed at substantially regular intervals in the circumferential direction. In addition, in the flange portion 63 of the ball screw nut 23, four through-holes 64 are formed at substantially regular intervals in the circumferential direction. Each through-hole 64 is formed as a long hole that extends in the circumferential direction. The bolts 65 passed through the corresponding through-holes 64 are screwed into the screw holes 62 that are at positions corresponding to the through-holes 64.

Because each through-hole 64 is formed as a long hole, it is possible to easily screw the bolts 65 into the screw holes 62 formed in the flange portion 61 located on the motor shaft 6-side through the through-holes 64 regardless of the circumferential positions of the through-holes 64 formed in the flange portion 63 of the ball screw nut 23 screwed to the motor shaft 6. Thus, it is possible to improve the work efficiency during production.

Figure 13:
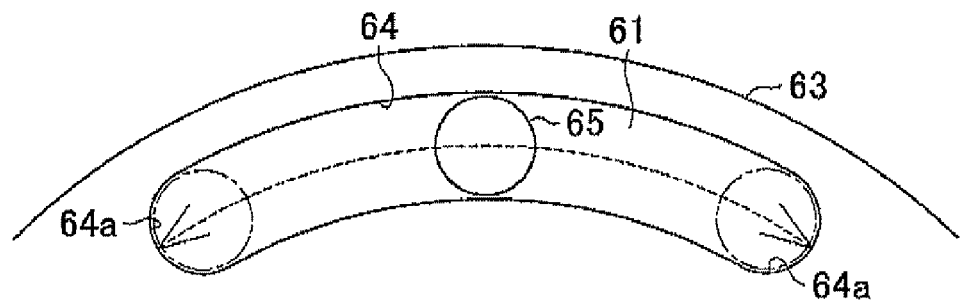
FIG. 13 is a view illustrating the manner in which the bolt is fitted in a through-hole.
Figure 14:
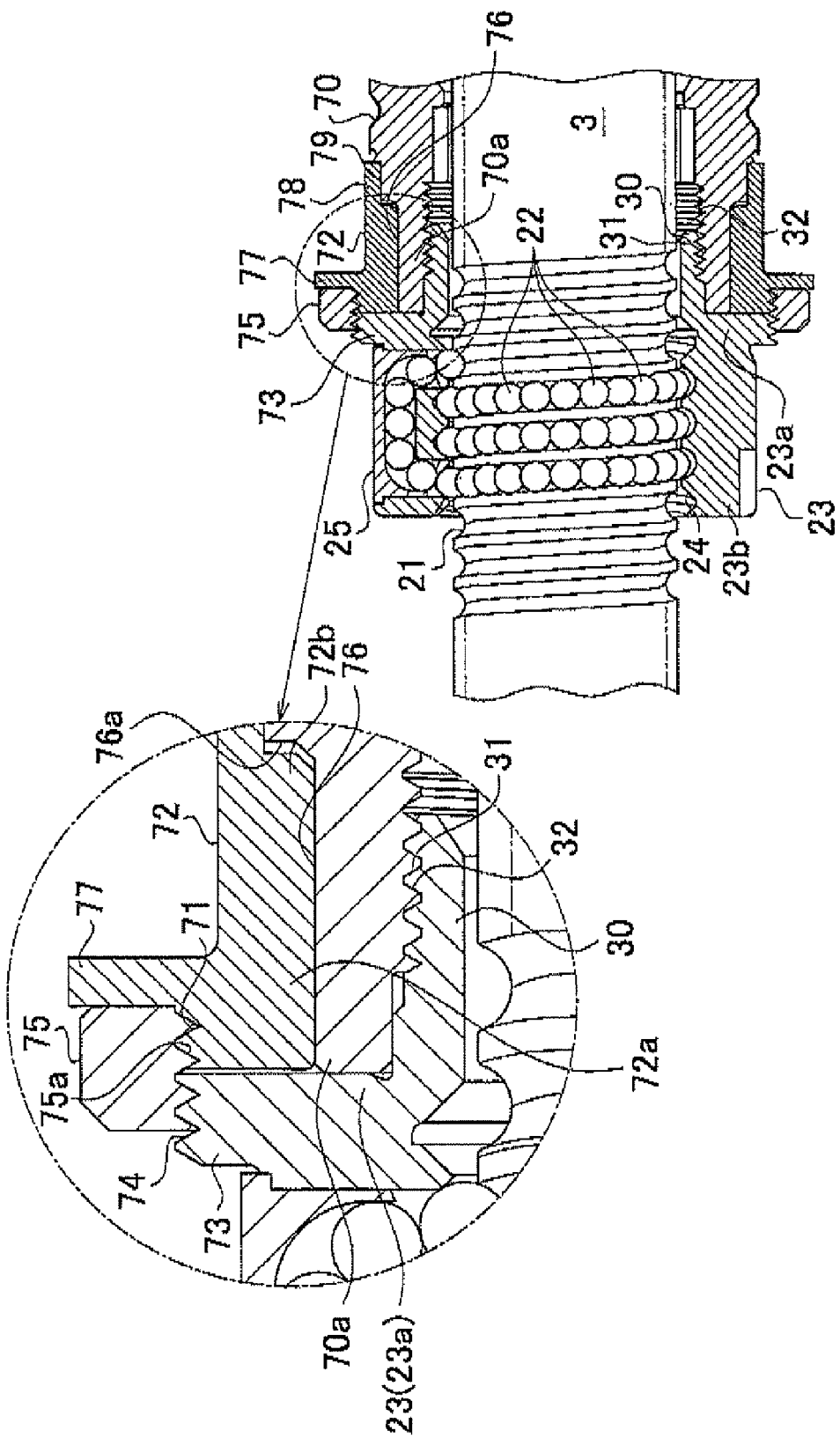
FIG. 14 is an enlarged cross-sectional view showing a ball screw device and portions near the ball screw device according to a third embodiment.
Figure 15:
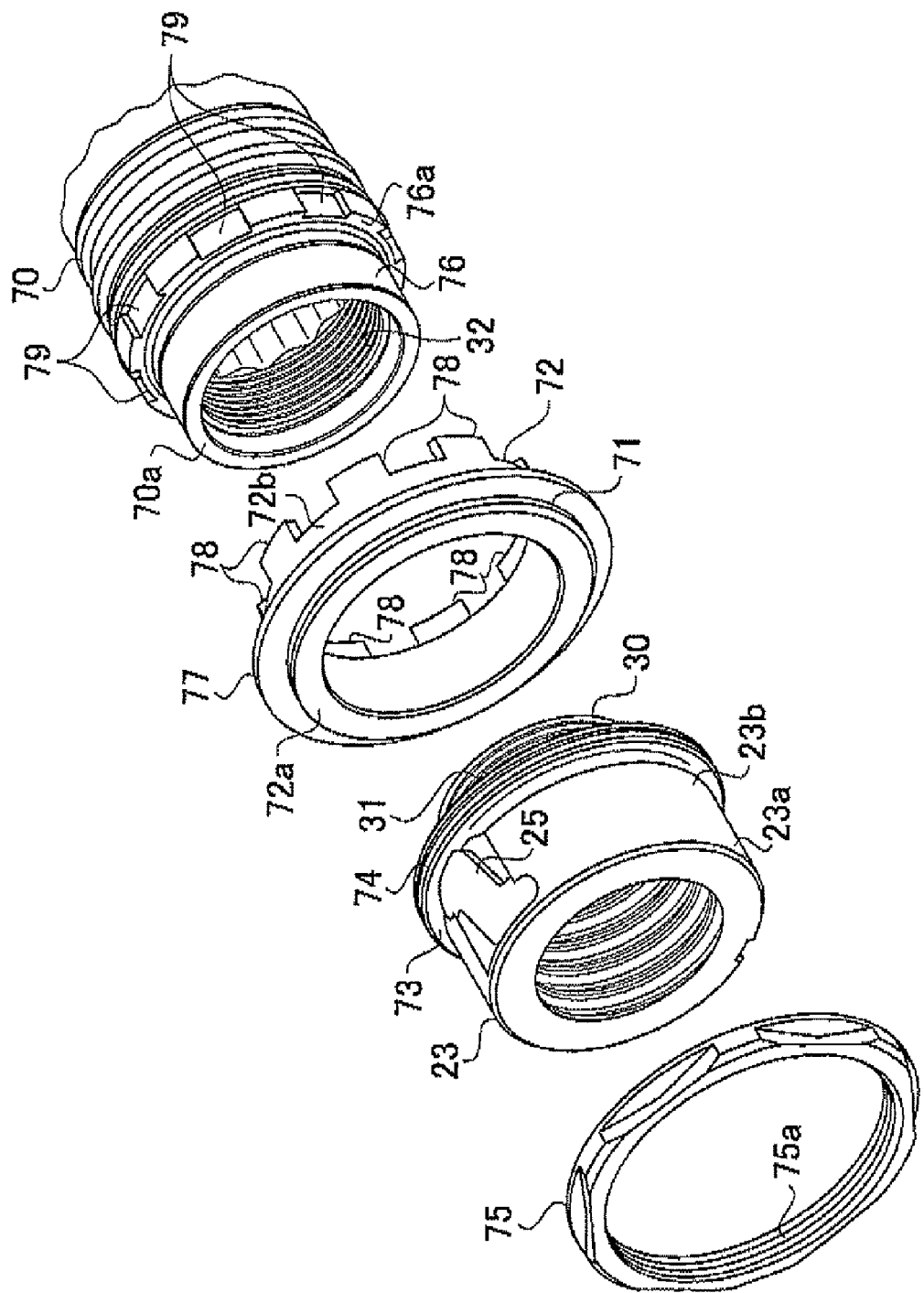
FIG. 15 is a perspective view showing a ball screw nut, a motor shaft, a cylindrical member and a nut according to the third embodiment.
Figure 16:
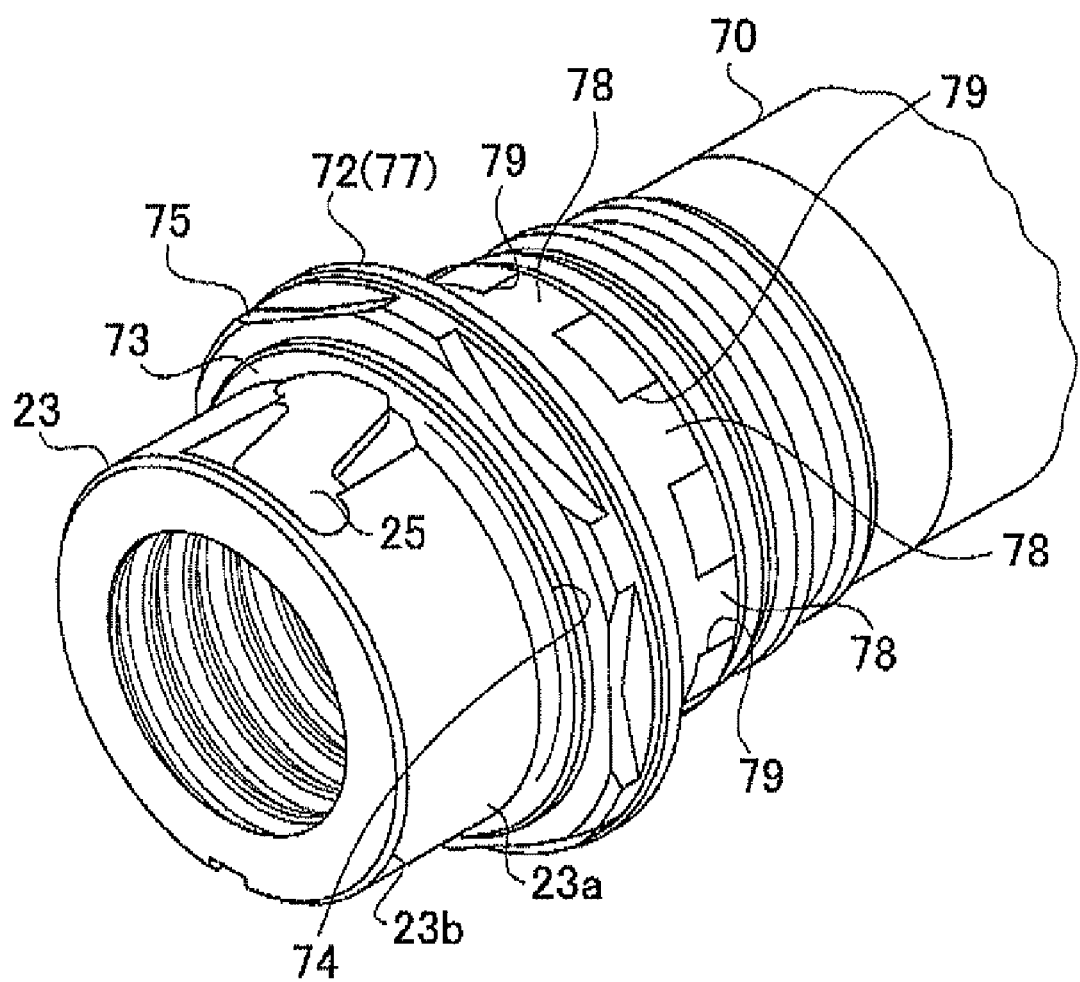
FIG. 16 is a perspective view showing the motor shaft to which the ball screw nut, the cylindrical member and the nut are fitted.
Figure 17B:
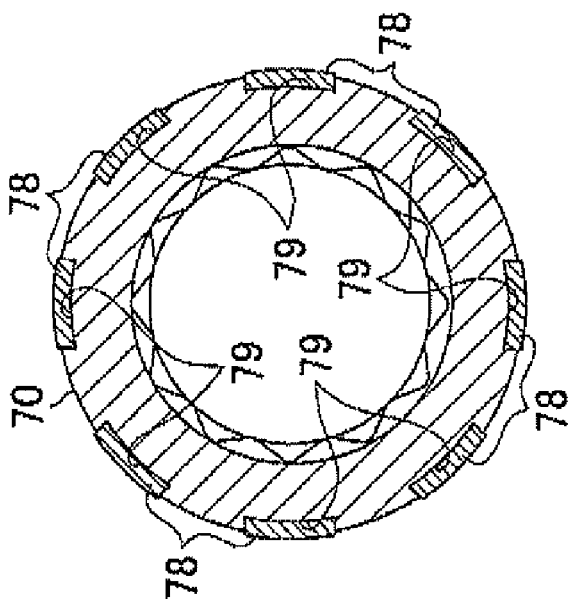
FIG. 17B is a cross sectional view showing the motor shaft to which the ball screw nut, the cylindrical member and the nut are fitted, taken along the line B-B in FIG. 17A.
Figure 17A:
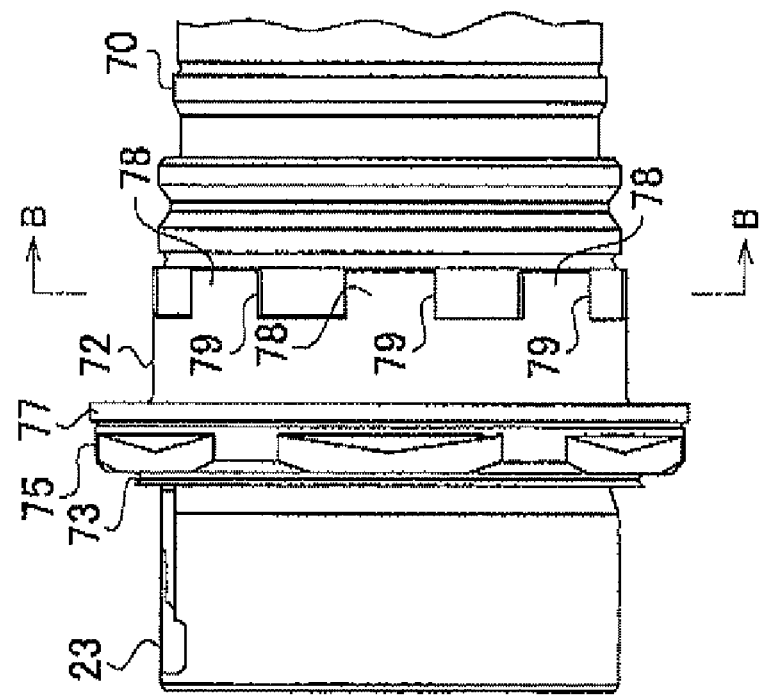
FIG. 17A is a side view showing the motor shaft to which the ball screw nut, the cylindrical member and the nut are fitted.

As shown in FIG. 13, if the ball screw nut 23 is loosened, relative displacement in the circumferential direction is caused between the ball screw nut 23 and the motor shaft 6 due to the loosening of the ball screw nut 23. Therefore, the bolts 65 move within the through-holes 64, formed as long holes, along the circumferential direction. The bolts 65 contact the side walls 64a and are engaged with the side walls 64a. Thus, relative displacement between the ball screw nut 23 and the motor shaft 6 is restricted. As a result, it is possible to restrict further loosening of the ball screw nut 23.

In addition, when the bolts 65 contact the side walls 64a after moving within the through-holes 64, contact sound is generated. The contact sound notifies a driver of loosening of the ball screw nut 23. Due to this function as an alarming device, it is possible to promote the driver to have the ball screw nut 23 tightened in an early stage in which the loosening of the ball screw nut 23 does not exert influence on safety.

The bolts 65 that are screwed into the screw holes 62 are further tightened. Thus, the original function as the fastening member is fulfilled, that is, a force for fastening the flange portion 61 located on the motor shaft 6-side and the flange portion 63 of the ball screw nut 23 to each other is generated. Loosening of the ball screw nut 23 is restricted using a frictional force generated by the fastening force.

According to the second embodiment, the following effects are obtained.

1) The bolts 65 passed through the through-holes 64 formed in the flange portion 63 of the ball screw nut 23 are screwed into the screw holes 62 formed in the flange portion 61 located on the motor shaft 6-side.

With the structure described above, if relative displacement in the circumferential direction is caused between the motor shaft 6 and the ball screw nut 23, the bolts 65 are engaged with the side walls 64a of the through-holes 64. Thus, the relative rotation between the motor shaft 6 and the ball screw nut 23 is restricted. Thus, it is possible to restrict loosening of the ball screw nut 23.

In addition, because the bolts 65 that are the columnar members that constitute the first engagement portions are used, the work for fitting the first engagement portions to the flange portion 61 is facilitated. Thus, it is possible to improve the work efficiency during production. In addition, the original function as the fastening member is fulfilled, that is, a force for fastening the flange portion 61 located on the motor shaft 6-side and the flange portion 63 of the ball screw nut 23 to each other is generated. Loosening of the ball screw nut 23 is more effectively restricted using a frictional force generated by the fastening force.

2) Each through-hole is formed as a long hole that extends in the circumferential direction. With the structure described above, it is possible to easily screw the bolts 65 into screw holes 62 formed in the flange portion 61 located on the motor shaft 6-side through the through-holes 64 regardless of the circumferential positions of the through-holes 64 formed in the flange portion 63 of the ball screw nut 23 screwed to the motor shaft 6. Consequently, it is possible to improve the work efficiency during production.

In addition, when the bolts 65 contact the side walls 64a after moving within the through-holes 64 due to the relative rotation between the ball screw nut 23 and the motor shaft 6, contact sound is generated. Therefore, it is possible to notify the driver of loosening of the ball screw nut 23 using the contact sound. Due to this function as the alarming device, it is possible to promote the driver to have the ball screw nut 23 tightened in an early stage in which the loosening of the ball screw nut 23 does not exert influence on safety. As a result, higher reliability is ensured.

3) The flange portion 61 located on the motor shaft 6-side and the ball screw nut 23 are screwed to the axial end portion 6a of the motor shaft 6 in such a manner that the screw direction of the ball screw nut 23 is opposite to the screw direction of the flange portion 61. With the structure described above, when one of the flange portion 61 provided with the bolts 65 and the ball screw nut 23 having the through-holes 64 into which the bolts 65 are engaged is loosened, the other of the flange portion 61 and the ball screw nut 23 is tightened. Therefore, even if the ball screw nut 23 is loosened, the flange member 61 is tightened due to the engagement of the bolts 65 in the through-holes 64. Thus, it is possible to restrict further loosening of the ball screw nut 23.

Hereafter, a third embodiment of the invention will be described with reference to the accompanying drawings. For convenience of explanation, the same portions as those in the first embodiment will be denoted by the same reference numerals as those in the first embodiment, and description thereof will not be provided below.

As shown in FIG. 14 to FIGS. 17A and B, a cylindrical member 72 having a threaded portion 71 in its outer periphery is fitted on the outer periphery of a motor shaft 70, more specifically, on the outer periphery of an axial end portion 70a to which the ball screw nut 23 is screwed in such a manner that the cylindrical member 72 and the motor shaft 70 are not allowed to rotate relative to each other. A threaded portion 74 that corresponds to the threaded portion 71 formed in the outer periphery of the cylindrical member 72 fitted on the motor shaft 70 is formed in the outer periphery of the ball screw nut 23, more specifically, in the outer periphery of a flange portion 73 formed on an axial end portion 23a (end portion on the right side in FIG. 14: end portion on the side on which the ball screw nut 23 is screwed to the motor shaft 70). Then, a threaded portion 75a of a nut 75 is screwed to the two threaded portions 71 and 74 that are arranged next to each other in the axial direction when the ball screw nut 23 is screwed to the motor shaft 70. The nut 75 is screwed to the two threaded portions 71 and 74 so as to straddle these threaded portions 71 and 74. Thus, it is possible to restrict relative rotation between the motor shaft 70 and the ball screw nut 23 to restrict loosening of the ball screw nut 23.

More specifically, an annular engagement recess 76 is formed in the outer periphery of the axial end portion 70a of the motor shaft 70, and the cylindrical member 72 is fitted (engaged) in the engagement recess 76 so as to be movable in the axial direction. When the cylindrical member 72 is fitted in the engagement recess 76, the threaded portion 71 is formed in the outer periphery of an axial end portion (left axial end portion in FIG. 14) 72a located on the side on which the ball screw nut 23 is screwed to the motor shaft 70.

The threaded portion 71 in the outer periphery of the cylindrical member 72 and the threaded portion 74 in the outer periphery of the flange portion 73 of the ball screw nut 23 are formed in such a manner that the threaded portion 71 and the threaded portion 74 have substantially the same outer diameter, screw thread height and pitch when the ball screw nut 23 is screwed to the motor shaft 70. Then, it is possible to screw the threaded portion 75a of the nut 75 to the threaded portions 71 and 74 by adjusting the axial position of the cylindrical member 72 fitted on the motor shaft 70.

A flange portion 77 that extends radially outward is formed on the outer periphery of the cylindrical member 72. The nut 75 screwed to the threaded portions 71 and 74 is tightened in such a direction that the nut 75 is pressed against the flange portion 77. As a result, the position of the nut 75 is determined.

The cylindrical member 72 has multiple engagement projections 78 that axially extend from an axial end (left axial end in FIG. 14) 72b that is positioned distal to the ball screw nut 23 when the cylindrical member 72 and the ball screw nut 23 are fitted to the motor shaft 70. Multiple engagement recesses 79 into which the engagement projections 78 are fitted are formed in the outer periphery of the motor shaft 70. More specifically, each engagement recess 79 is formed so as to open at an axial end face 76a of the engagement recess 76 formed in the axial end portion 70a of the motor shaft 70. That is, each engagement projection 78 formed at the axial end portion 72b of the cylindrical member 72 is inserted into the corresponding engagement recess 79 when the cylindrical member 72 is engaged in the engagement recess 76. When the engagement projections 78 are engaged in the engagement recesses 79, the rotation of the cylindrical member 72 relative to the motor shaft 70 is restricted.

The threaded portion 75a of the nut 75 is screwed to the two threaded portions 71 and 74. The threaded portion 71 is formed in the outer periphery of the cylindrical member 72 that is fitted to the axial end portion 70a of the motor shaft 70 in such a manner that the cylindrical member 72 is not allowed to rotate relative to the motor shaft 70. The threaded portion 74 is formed in the outer periphery of the flange portion 73 of the ball screw nut 23. Thus, the rotation of the ball screw nut 23 relative to the motor shaft 70 is restricted to restrict loosening of the ball screw nut 23. In addition, it is possible to easily screw the nut 75 to the two threaded portions 71 and 74 that are arranged next to each other in the axial direction, by adjusting the axial position of the cylindrical member 72 that is fitted on the motor shaft 70. Accordingly, with the simple structure described above, it is possible to easily and reliably restrict loosening of the ball screw nut 23.

Hereafter, a fourth embodiment of the invention will be described with reference to the accompanying drawings. For convenience of explanation, the same portions as those in the first embodiment will be denoted by the same reference numerals as those in the first embodiment, and description thereof will not be provided below.

A structure for securing the ball screw nut 23 to the motor shaft 6 in the EPS 1 according to the fourth embodiment will be described below. As shown in FIGS. 26 to 29, the hollow threaded shaft 30 that extends in the axial direction is formed at the axial end portion 23a (right end portion in FIG. 27) of the ball screw nut 23. In addition, the threaded portion 32 that corresponds to the threaded portion 31 formed in the outer periphery of the threaded shaft 30 is formed in the inner periphery of the motor shaft 6. When the threaded portion 31 of the threaded shaft 30 formed at the axial end portion 23a of the ball screw nut 23 is screwed to the threaded portion 32 formed in the inner periphery of the motor shaft 6, the ball screw nut 23 is secured to the axial end portion 6a of the motor shaft 6.

The flange member 33 is fitted to the outer periphery of the axial end portion 6a of the motor shaft 6. The flange member 33 is larger in outer diameter than the ball screw nut 23. By restricting the rotation of the flange member 33, it is possible to restrict simultaneous rotation of the ball screw nut 23 and the motor shaft 6 in the same direction when the ball screw nut 23 is screwed to the motor shaft 6.

The flange member 33 has the cylindrical base portion 34 and the rib portion 35 that extends radially outward from the outer periphery of the base portion 34. The flange portion 36 that extends radially outward is formed at the axial end portion 23a of the ball screw nut 23. The outer diameter R1 of the rib portion 35 of the flange member 33 is larger than the outer diameter R2 of the flange portion 36 of the ball screw nut 23 (see FIG. 27: R1>R2). Thus, the outer peripheral edge of the rib portion 35 is located further radially outward than the outer peripheral edge of the flange portion 36 of the ball screw nut 23.

A spline engagement portion (serration engagement portion) 37 and a spline engagement portion (serration engagement portion) 38 are formed in the inner periphery of the base portion 34 of the flange member 33 and the outer periphery of the axial end portion 6a of the motor shaft 6, respectively. When the spline engagement portions 37 and 38 are engaged with each other, the relative rotation between the motor shaft 6 and the flange member 33 is restricted.

That is, when the ball screw nut 23 is screwed to the motor shaft 6, the motor shaft 6 attempts to rotate in the same direction as the ball screw nut 23. However, if the rotation of the flange member 33 is restricted by, for example, a jig, it is possible to restrict the rotation of the motor shaft 6 together with the ball screw nut 23 when the ball screw nut 23 is screwed to the motor shaft 6. This is because the motor shaft 6 is engaged with the flange member 33. In the fourth embodiment, by holding the rib portion 35 of the flange member 33 which projects radially outward from the outer periphery of the ball screw nut 23, it is possible to restrict the motor shaft 6 from rotating together with the ball screw nut 23 when the ball screw nut 23 is screwed to the motor shaft 6.

The ball screw nut 23 and the motor shaft 6 may be connected to each other in such a manner that the relative rotation is restricted by the flange member 33.

If the flange member 33 and the motor shaft 6 are spline-engaged with each other with a clearance left therebetween in the axial direction, the flange member 33 moves relative to the motor shaft 6 in the axial direction and hits the motor shaft 6. As a result, abnormal noise may be generated. Therefore, an elastic member 33a (see FIGS. 28 and 29) that urges the flange member 33 in the axial direction is arranged at an axial end portion 34a of the flange member 33. Thus, it is possible to restrict the axial movement of the flange member 33 relative to the motor shaft 6, thereby preventing generation of abnormal noise.

Figure 28:
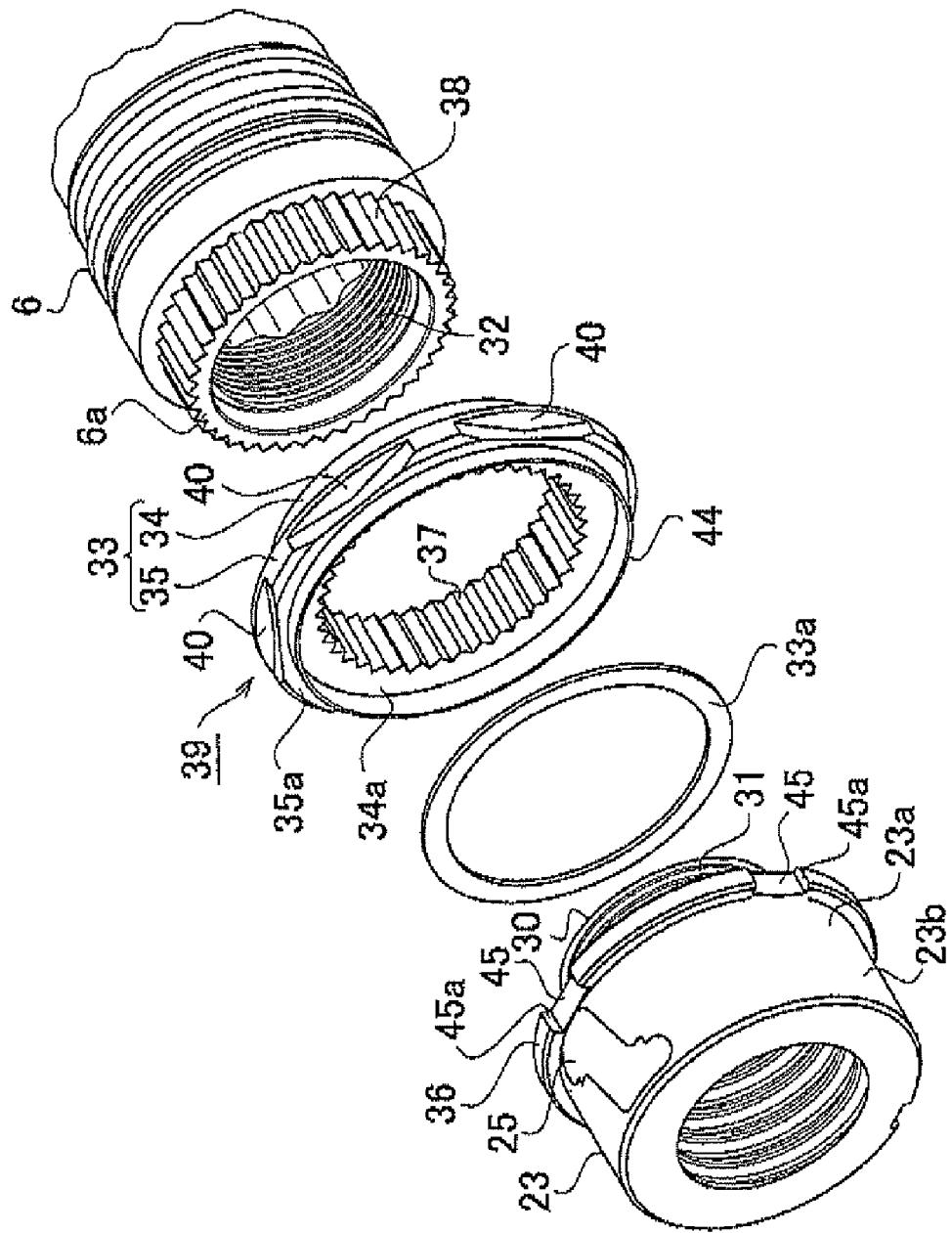
FIG. 28 is a perspective view showing a ball screw nut, a motor shaft and a flange member according to the fourth embodiment.
Figure 29:
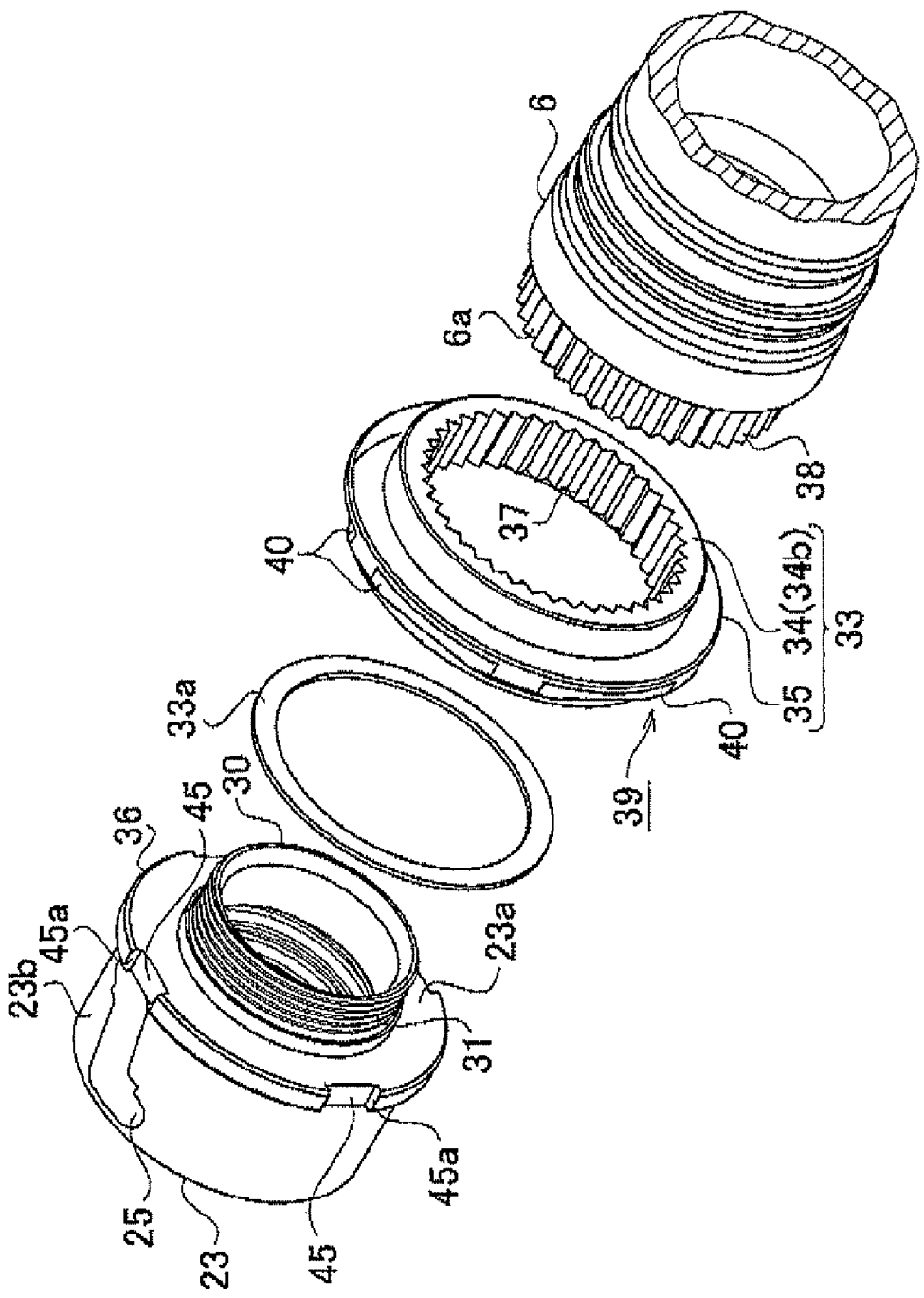
FIG. 29 is a perspective view showing the ball screw nut, the motor shaft and the flange member according to the fourth embodiment.
Figure 30:
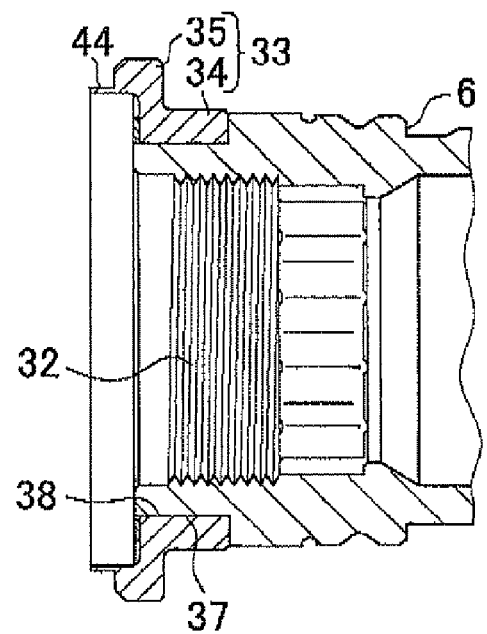
FIG. 30 is a cross-sectional view showing the motor shaft to which the flange member is fitted in the fourth embodiment.
Figure 31:
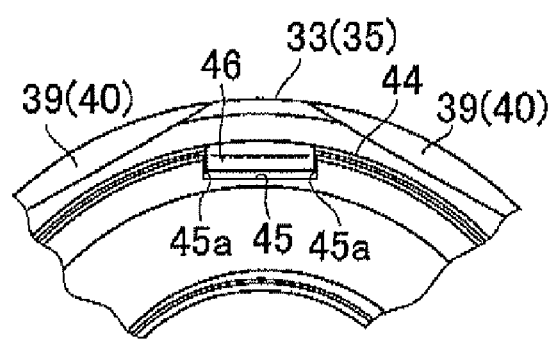
FIG. 31 is a front view showing the state where a thin-plate portion of the flange member is swaged into a cutout formed in a flange portion of the ball screw nut.
Figure 32B:
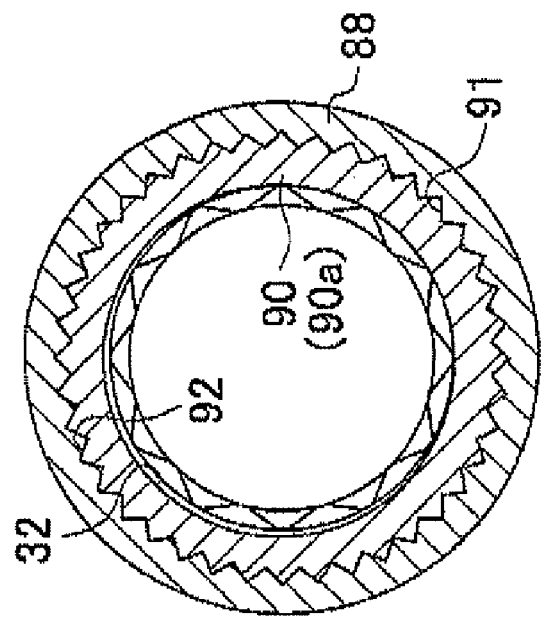
FIG. 32B is a cross-sectional view showing the motor shaft to which the flange member is fitted, taken along the line A-A in FIG. 32A.
Figure 32A:
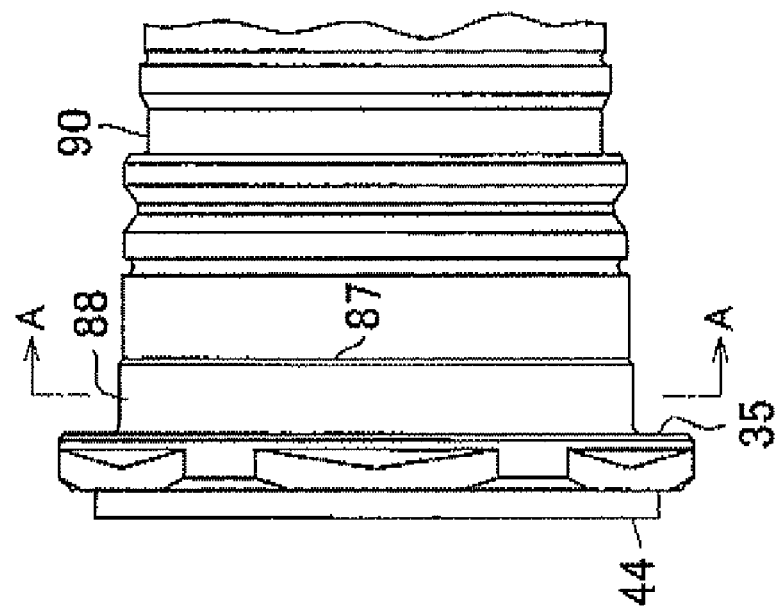
FIG. 32A is a side view showing the motor shaft to which the flange member is fitted according to the fourth embodiment.

The elastic member 33a is required to have a function of urging the flange member 33 in one direction to restrict the movement of the flange member 33 relative to the motor shaft 6. The elastic member 33a in FIGS. 28 and 29 is a wave washer. Alternatively, for example, a disc spring, a resin sheet, or an O-ring may be used as the elastic member 33a. The elastic member 33a may be provided at an axial end portion 34b at which the flange member 33 contacts the motor shaft 6, instead of the axial end portion 34a at which the flange member 33 contacts the ball screw nut 23.

The above-described embodiments may be modified as follows.

In each embodiment described above, the invention is applied to the coaxial-motor-type EPS in which the motor 4 and the rack shaft 3 are arranged coaxially with each other. However, the EPS to which the invention is applied is not limited to the coaxial-motor-type EPS. The invention may be applied to any types of EPS as long as the EPS is a rack-assist-type EPS which has a motor shaft driven by a motor and in which a ball screw nut is screwed to an axial end portion of the motor shaft. That is, the invention may be applied to, for example, a parallel-arrangement rack-assist-type EPS in which a motor and a rack shaft are arranged parallel to each other and the rotation of the motor is transmitted to the rack shaft via a gear or a belt, or a cross-arrangement rack-assist-type EPS in which the axis of a motor obliquely crosses a rack shaft and the rotation of the motor is transmitted to the rack shaft via a bevel gear.

In the first embodiment described above, the thin-plate portion 44 is formed in an annular shape so as to surround the outer periphery of the flange portion 36 of the ball screw nut 23. However, the thin-plate portion 44 is not limited to this. For example, multiple rectangular thin-plate portions may extend in the axial direction toward the ball screw nut 23.

In the first embodiment, cutouts 45 used as the engagement recesses are formed in the ball screw nut 23 and the thin-plate portion 44 is formed on the motor shaft 6-side. Alternatively, a thin-plate portion may be formed on the ball screw nut-side, and the engagement recesses may be formed in the motor shaft-side. When the rectangular thin-plate portions are formed as described above, both the thin-plate portions and the corresponding engagement recesses may be formed on the ball screw nut-side and the motor shaft-side. Thus, it is possible to more reliably restrict loosening of the ball screw nut 23.

In the first embodiment described above, the multiple cutouts 45 are formed in the flange portion 36 formed in the axial end portion 23a of the ball screw nut 23, and these cutouts 45 are used as the engagement recesses into which the thin-plate portion 44 is swaged. However, any structure may be employed as long as the structure includes side walls (corresponding to the side faces 45a) that may restrict the rotation of the ball screw nut 23 relative to the motor shaft 6 when the thin-plate portion 44 is swaged. For example, engagement recesses may be directly formed in the outer peripheral face of the ball screw nut 23.

In the first embodiment, the thin-plate portion 44 is formed on the flange member 33, and fitted together with the flange member 33 to the outer periphery of the axial end portion 6*a* of the motor shaft 6. Alternatively, the thin-plate portion 44 may formed integrally with the motor shaft 6.

When a thin-plate portion for swaging is formed on another member that is fitted to the motor shaft, the manner in which this member is fitted to the motor shaft need not be the manner in which the flange member 33 is fitted to the motor shaft. The flange member 33 is fitted to the motor shaft 6 in such a manner that the screw direction of the flange member 33 is opposite to the screw direction of the motor shaft 6. The member may be fitted to the motor shaft 6 in any manner as long as the member is not allowed to rotate in such a direction that the ball screw nut 23 is loosened. Accordingly, the member may be fitted to the motor shaft 6 in such a manner that the member is not allowed to rotate relative to the motor shaft 6.

Figure 18:
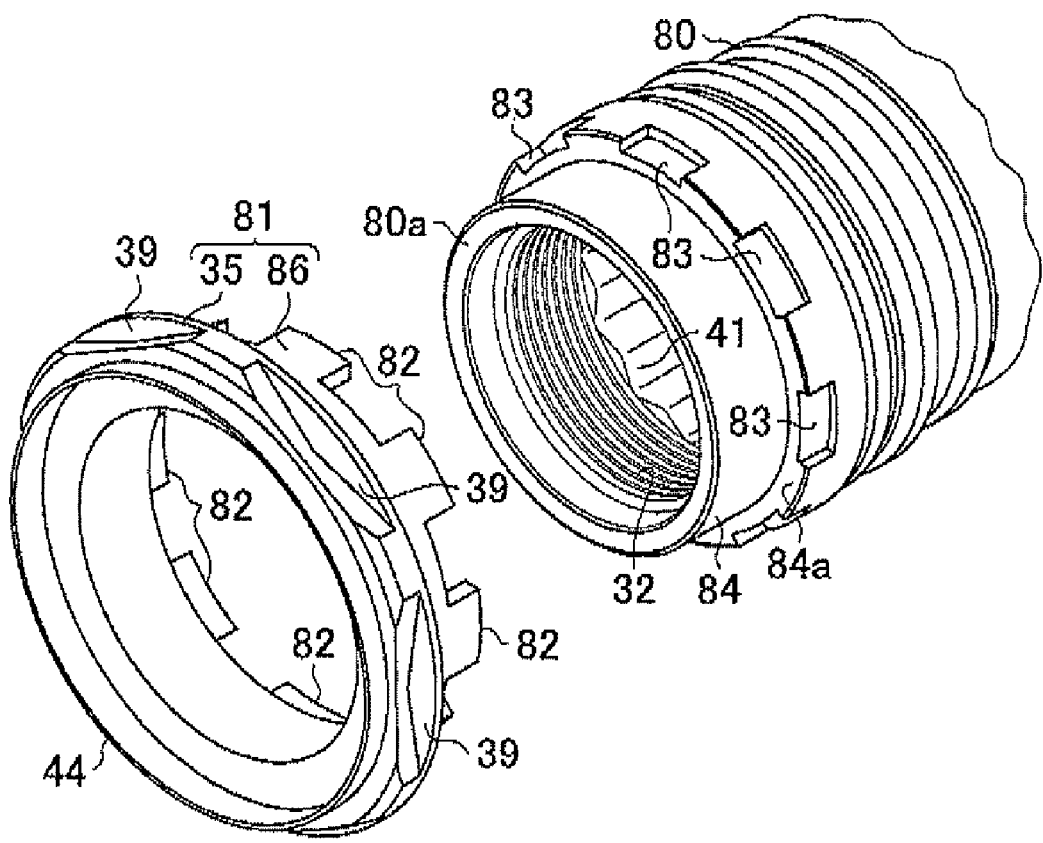
FIG. 18 is a perspective view showing a flange member and a motor shaft in a first modification of the embodiment.

More specifically, as shown in, for example, FIGS. 18, 19A and 19B, a flange member 81 is fitted to the outer periphery of a motor shaft 80. Then, engagement projections 82 formed on the flange member 81 are engaged in engagement recesses 83 formed in the motor shaft 80 to restrict the rotation of the flange member 81 relative to the motor shaft 80. With this structure, it is possible to obtain the effects that are the same as those obtained in the first embodiment.

In the structure for fitting the flange member 81 on the outer periphery of the motor shaft 80, an engagement recess 84 similar to the engagement recess 76 in the third embodiment (see FIG. 14 to FIGS. 17A and B) may be formed in an axial end portion 80*a* of the motor shaft 80. The engagement projections 82 on the flange member 81 and the engagement recesses 83 in the motor shaft 80 may be formed so as to be similar to the engagement projections 78 and the engagement recesses 79 (see FIG. 14 to FIGS. 17A and B) in the third embodiment, respectively. Each engagement projection 82 may extend in the axial direction from a base end portion 86 of the flange member 81, and each engagement recess 83 may be formed so as to open at an axial end face 84*a* of the engagement recess 84 formed at the axial end portion 80*a* of the motor shaft 80.

Figure 20:
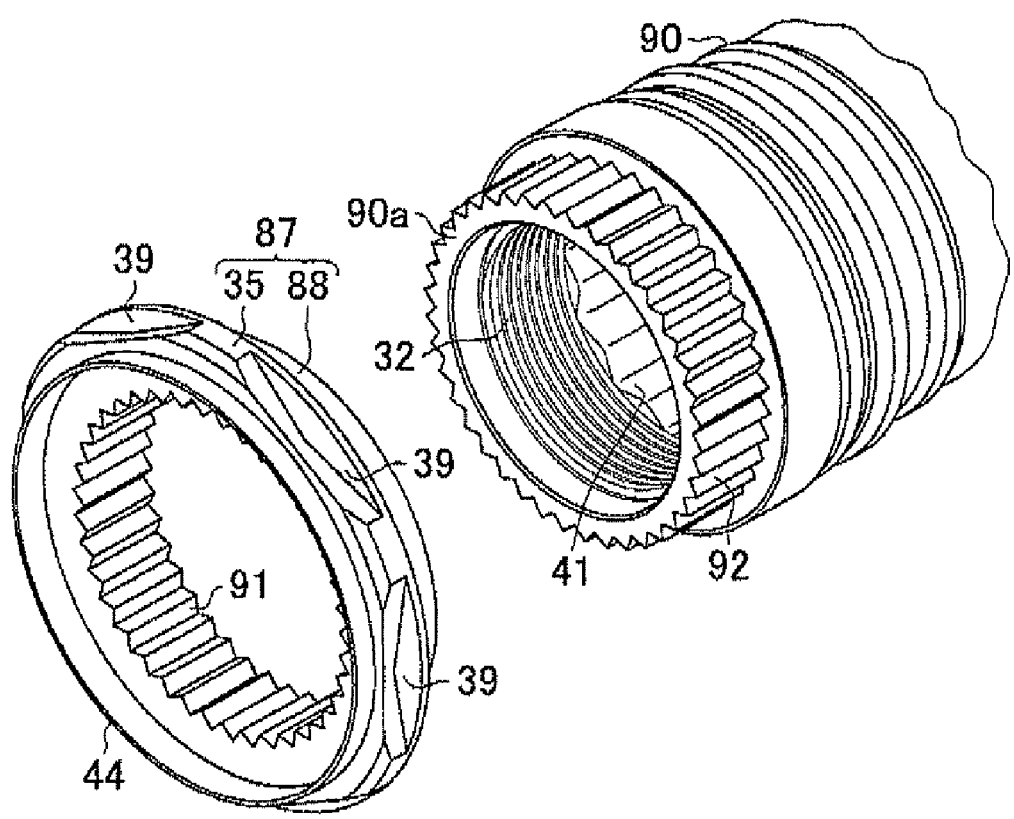
FIG. 20 is a perspective view showing a flange member and a motor shaft in a second modification of the embodiment.
Figure 21B:
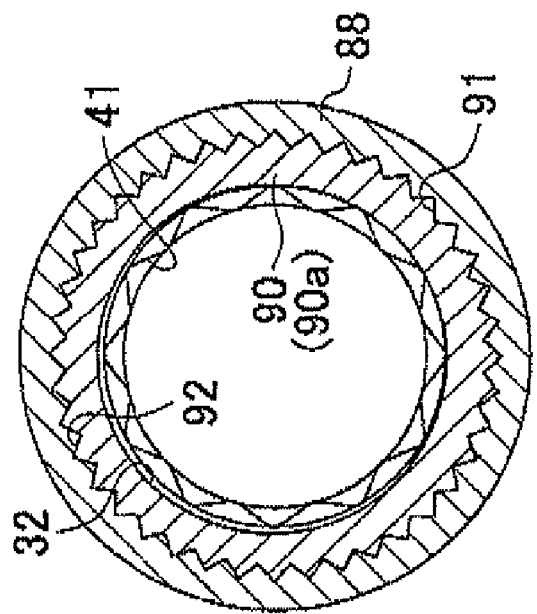
FIG. 21B is a cross-sectional view showing the motor shaft to which the flange member is fitted in the second modification, taken along the line D-D in FIG. 21A.
Figure 21A:
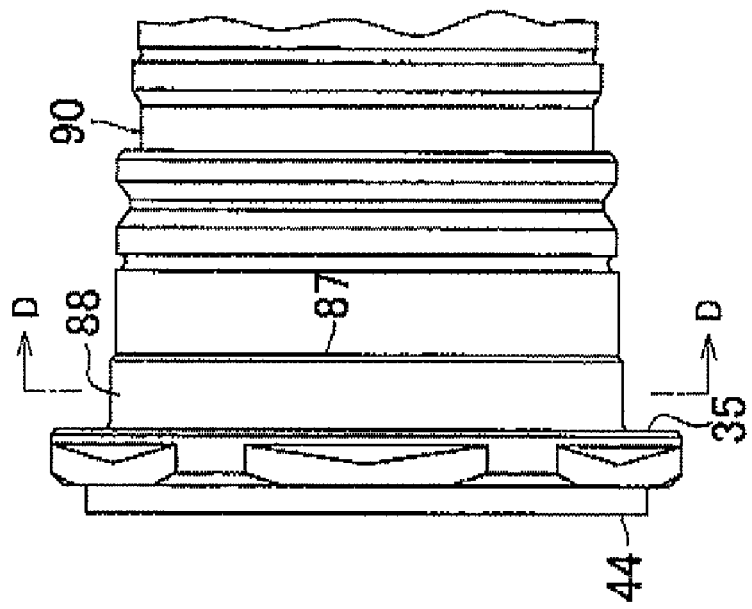
FIG. 21A is a side view showing the motor shaft to which the flange member is fitted in the second modification.

In addition, the structure for fitting the flange member to the motor shaft in such a manner that the flange member and the motor shaft are not allowed to rotate relative to each other is not limited to the example shown in FIGS. 18, 19A and 19B. For example, as shown in FIGS. 20, 21A and 21B, a spline-engagement portion (serration-engagement portion) 91 is formed in the inner periphery of a base portion 88 of a flange member 87, and a spline-engagement portion (serration-engagement portion) 92 is formed in the outer periphery of an axial end portion 90*a* of a motor shaft 90. When the spline-engagement portions 91 and 92 are engaged with each other, relative rotation between the motor shaft 90 and the flange member 87 is restricted. With this structure, it is possible to obtain the same effects as those obtained in the first embodiment.

In the second embodiment, the bolts 65 are used as the columnar members that constitute the first engagement portions when being fitted to the flange portion 61. Alternatively, columnar members other than bolts 65, for example, pins may be press-fitted into holes formed in the flange portion 61.

Each through-hole 64, through which the bolt 65 used as the columnar member passes, is formed as a long hole that extends in the circumferential direction. However, the shape of the through-hole 64 is not limited to the long hole-shape. The through-hole 64 may be in any shape as long as the rotation of the ball screw nut 23 relative to the motor shaft 6 is restricted when the columnar member (bolt 65, etc.) that constitute the first engagement portion is engaged in the through-hole 64. For example, the through-hole 64 may be formed as a circular hole.

In the second embodiment, the bolts 65 used as the columnar members are screwed to the flange portion 61 located on the motor shaft 6-side, and the multiple through-holes 64 through which the bolts 65 are passed are formed in the flange portion 63 of the ball screw nut 23. Alternatively, columnar members may be fitted to the flange of the ball screw nut, and through-holes through which the columnar members are passed may be formed in the flange portion on the motor shaft-side. Further alternatively, both columnar members that constitute the first engagement portions and the second engagement portions in which the first engagement portions are engaged may be formed in each of the flange on the motor shaft-side and the flange of the ball screw nut.

The first engagement portions and the second engagement portions need not be columnar members and through-holes formed in the flange portions.

Figure 22:
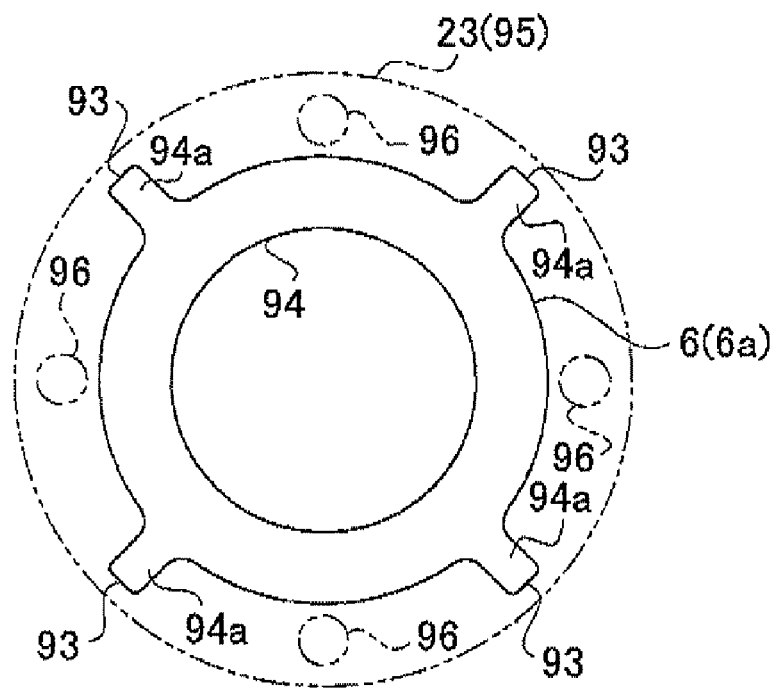
FIG. 22 is a view schematically showing columnar members used as first engagement portions formed on the ball screw nut and engagement projections used as second engagement portions formed at an axial end portion of the motor shaft.

More specifically, for example, as shown in FIG. 22, multiple (four in this modification) engagement projections 93 may be formed in the axial end portion 6*a* of the motor shaft 6, as the second engagement portions that project radially outward. Meanwhile, multiple (four in this modification) columnar members 96 are formed in a flange portion 95 of the ball screw nut 23, as the first engagement portions that extend in the axial direction toward the motor shaft 6.

In this modification, these engagement projections 93 are formed by securing an annular plate member 94, which has projections 94*a* that constitute the engagement projections 83 on its outer periphery, to the axial end face of the motor shaft 6. FIG. 22 shows the state where the flange portion 95 and the columnar members 96 formed on the ball screw nut 23, which are indicated by two-dot chain lines (imaginary lines), are arranged at positions closer to the reader than the axial end portion 6*a* (plate member 94) of the motor shaft 6 indicated by solid lines in the direction perpendicular to the sheet on which FIG. 22 is drawn. Accordingly, the direction in which the columnar members 96 axially extend toward the motor shaft 6 is the direction that is perpendicular to the sheet on which FIG. 22 is drawn and that is away from the reader.

Figure 23:
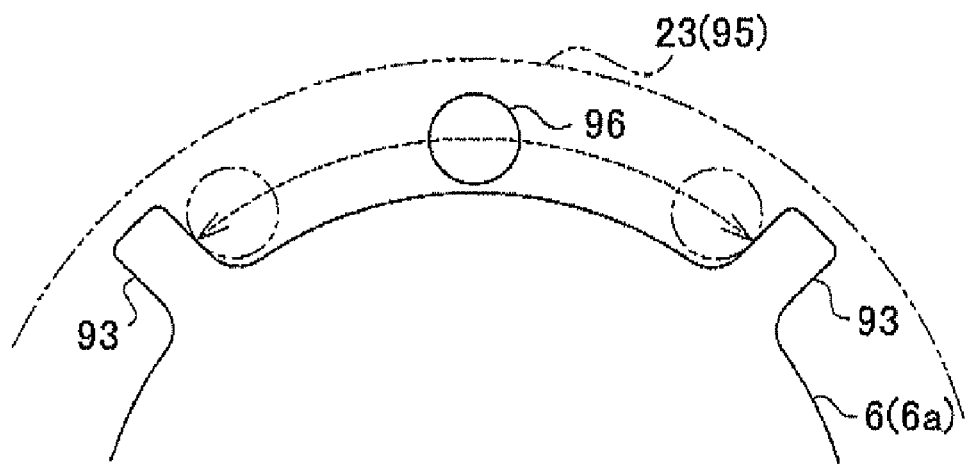
FIG. 23 is a view illustrating a manner in which the engagement projections used as the second engagement portions are engaged with the columnar members used as the first engagement portions.

As shown in FIG. 23, when the columnar members 96 used as the first engagement portions formed on the ball screw nut 23 contact and engages with the engagement projections 93 used as the second engagement portions formed on the motor shaft 6 due to the rotation of the ball screw nut 23 relative to the motor shaft 6, the relative rotation is restricted. With this structure, it is possible to obtain the effects that are the same as those obtained in the second embodiment described above.

In the third embodiment, the threaded portion 74 of the ball screw nut 23 is formed in the outer periphery of the flange portion 73 formed in the axial end portion 23*a*. Alternatively, the threaded portion 74 may be formed directly in the outer periphery of the ball screw nut 23.

In the third embodiment, the cylindrical member 72 is fitted in the engagement recess 76 that is formed in the axial end portion 70*a* of the motor shaft 70. Then, the engagement projections 78 formed in the cylindrical member 72 are engaged in the engagement recesses 79 formed in the motor shaft 70. Thus, the cylindrical member 72 is fitted to the motor shaft 70 in such a manner that the cylindrical member 72 is movable in the axial direction and is not allowed to rotate relative to the motor shaft 70. However, the structure for fitting the cylindrical member 72 to the motor shaft 70 in such a manner that the cylindrical member 72 is movable in the axial direction and is not allowed to rotate relative to the motor shaft 70 is not limited to this.

Figure 24:
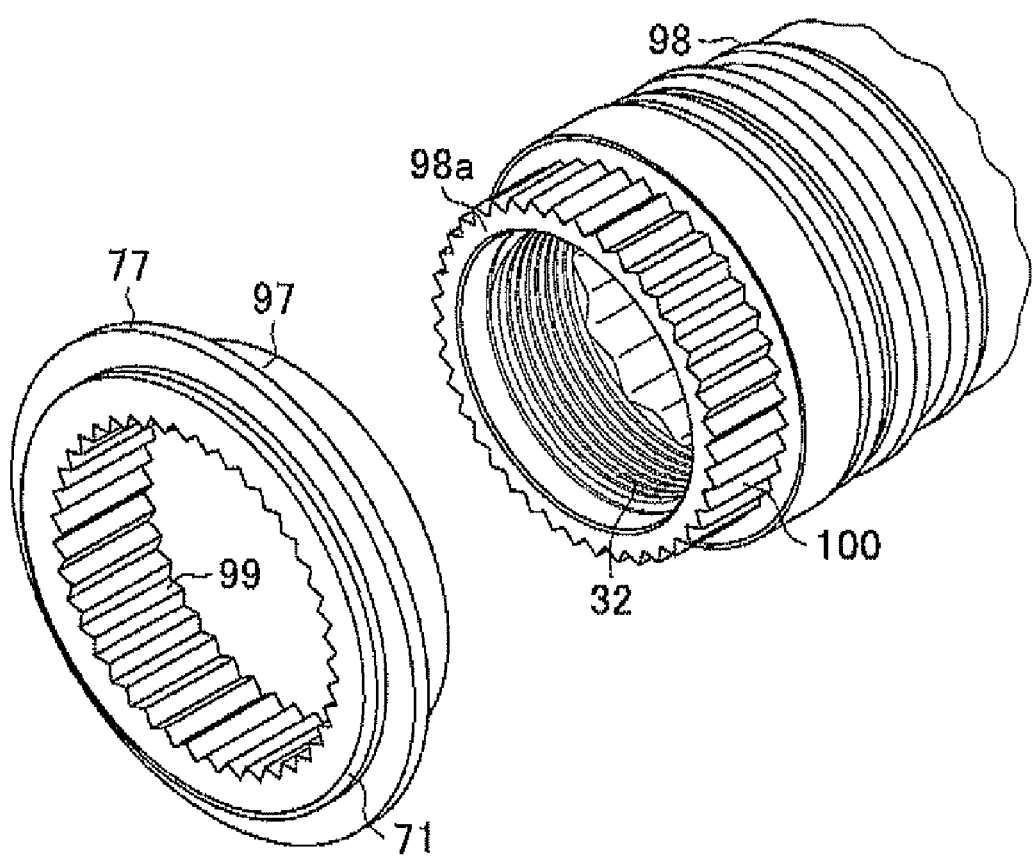
FIG. 24 is a perspective view showing a cylindrical member and a motor shaft in a third modification.
Figure 26:
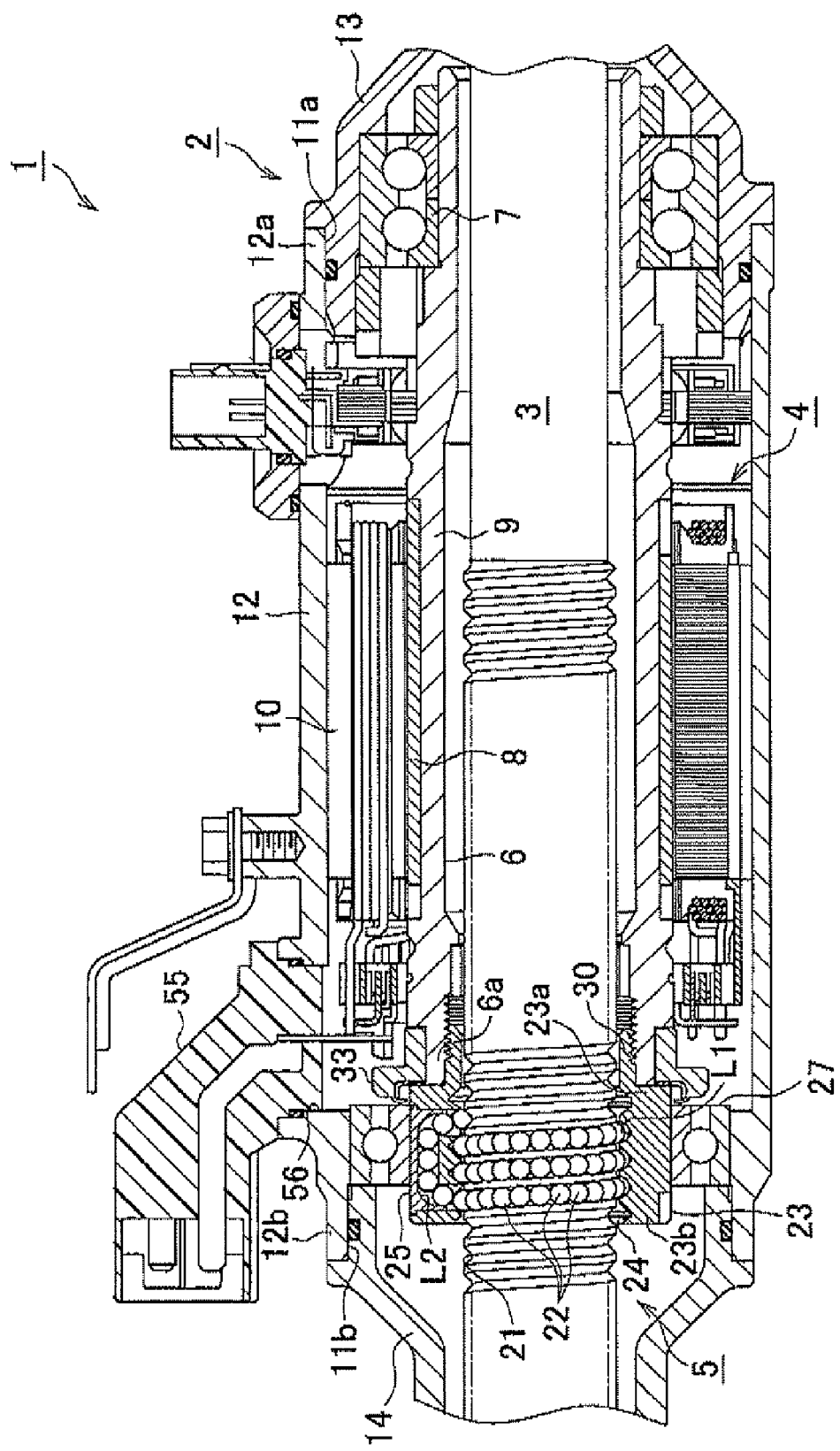
FIG. 26 is a cross-sectional view schematically showing the structure of an electric power steering system (EPS) according to a fourth embodiment.
Figure 27:
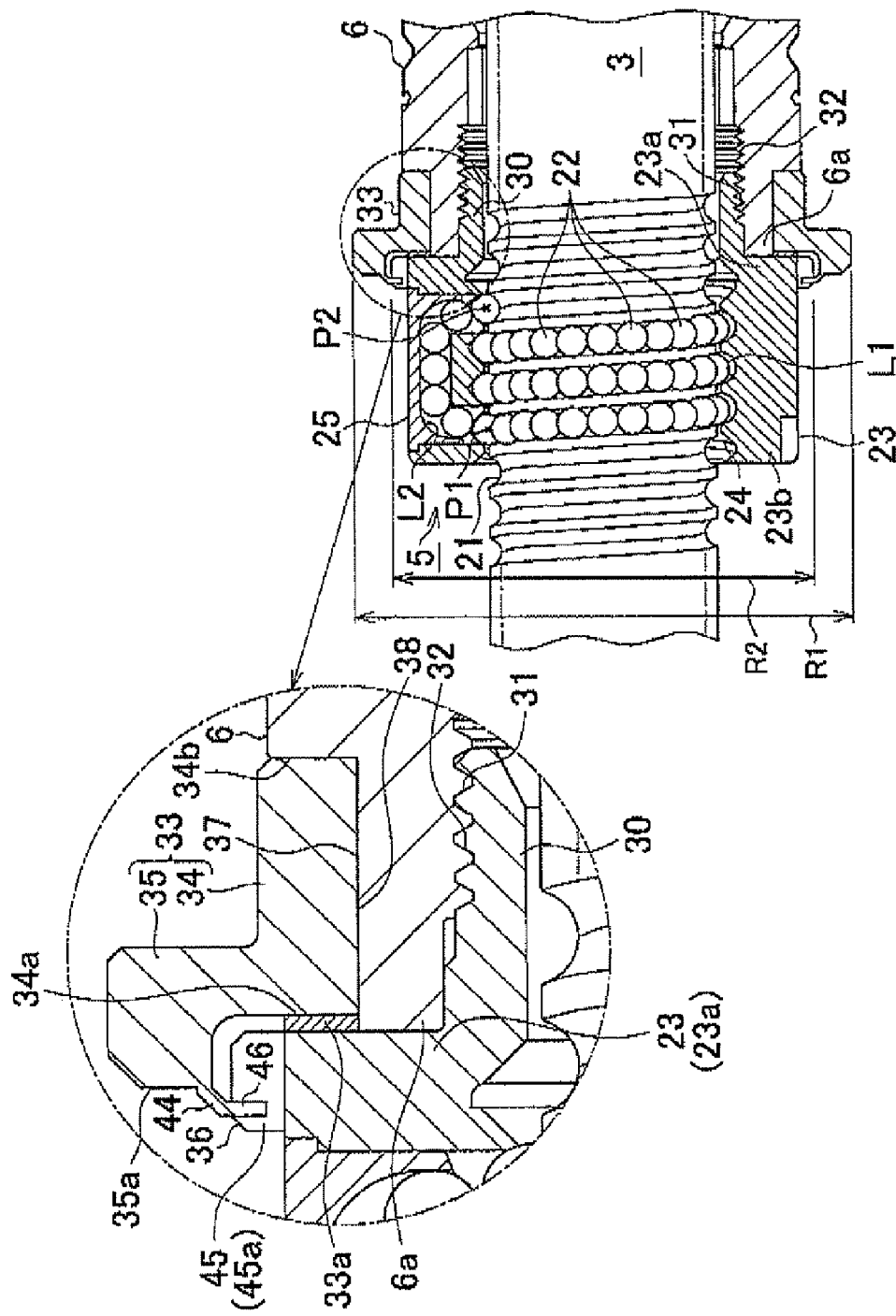
FIG. 27 is an enlarged cross-sectional view showing a ball screw device and portions near the ball screw device according to the fourth embodiment.

More specifically, as shown in, for example, FIGS. 24, 25A and 25B, a spline-engagement portion (serration engagement portion) 99 may be formed in the inner periphery of the cylindrical member 97, and a spline-engagement portion (serration engagement portion) 100 may be formed in the outer periphery of an axial end portion 98*a* of the motor shaft 98. Then, these spline-engagement portions 99 and 100 may be engaged with each other. With this structure, it is possible to fit the cylindrical member 72 to the motor shaft 70 in such a manner that the cylindrical member 72 is movable in the axial direction and is not allowed to rotate relative to the motor shaft 70.

Although not described in the second and third embodiments, a structure shown in FIG. 9 may be applied to the second and third embodiments. In the structure shown in FIG. 9, the axial movement of the ball screw nut 23 is restricted with the use of the ball bearing 27 interposed between the ball screw nut 23 and the motor housing 12 and the inserted portion 47 formed in the side housing 14.

The flange portions 61 and 63 provided with the elements that form the restriction portion (the bolts 65 and the through-holes 64) in the second embodiment may be located at positions that correspond to the hole 56 formed in the motor housing 12 to fit the feeding connector 55. Thus, it is possible to improve the work efficiency during production. Similarly, the cylindrical member 72 and the flange portion 73 provided with the elements that form the restriction portion (the threaded portions 71 and 74 and the nut 75) in the third embodiment may be located at positions that correspond to the hole 56 formed in the motor housing 12 to fit the feeding connector 55.

In the first embodiment, the flange member 33 that has the thin-plate portion 44 is fitted to the axial end portion 6*a* of the motor shaft 6. However, if there is no restriction on assembly, the flange member 33 may be formed integrally with the motor shaft 6. The flange member 60 in the second embodiment may be formed integrally with the motor shaft 6.

Figure 33:
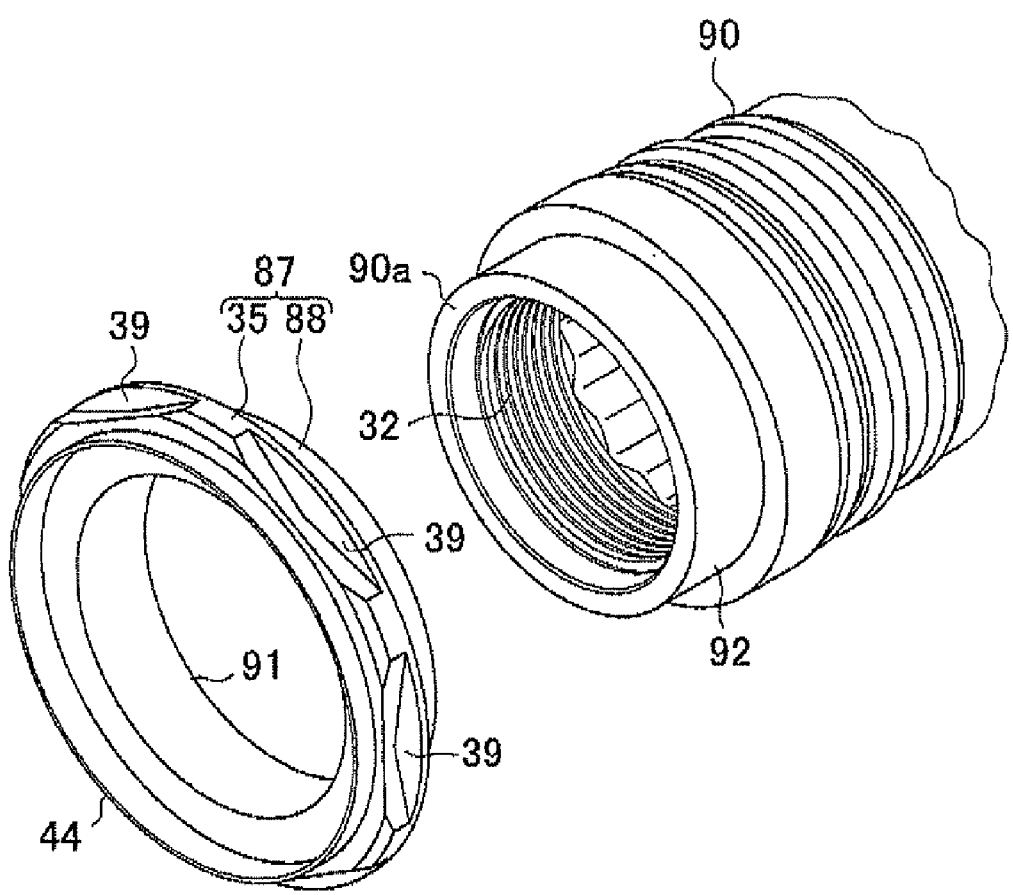
FIG. 33 is a perspective view showing a flange member and a motor shaft in a modification of the fourth embodiment.

In the fourth embodiment described above, the flange member 33 is spline-engaged with the motor shaft 6. In addition, the elastic member 33*a* is provided at the axial end portion of the flange member 33 to restrict the movement of the flange member 33 relative to the motor shaft 6. However, the structure for restricting the movement of the flange member 33 relative to the motor shaft 6 is not limited to the structure shown in FIGS. 28 and 29. For example, the structure shown in FIG. 33 may be employed. In the structure shown in FIG. 33, the relative movement and the axial relative rotation between the motor shaft 90 and the flange member 87 are restricted by press-fitting the axial end portion 92 of the motor shaft 90 to the inner peripheral face 91 of the base portion 88 of the flange member 87.

A projection may be formed in one of the inner peripheral face 91 of the base portion 88 of the flange member 87 and the outer peripheral face of the axial end portion 92 of the motor shaft 90, and a recess may be formed in the other of the inner peripheral face 91 and the outer peripheral face of the axial end portion 92. When the projection is engaged in the recess, the relative rotation and the relative movement between the motor shaft 90 and the flange member 87 are restricted.

The relative movement and the axial relative rotation between the motor shaft 90 and the flange member 87 may be restricted by applying an adhesive agent on the inner periphery 91 of the base portion 88 of the flange member 87 and the outer periphery of the axial end portion 92 of the motor shaft 90 and bonding the inner periphery 91 and the outer periphery of the axial end portion 92 to each other.

At least two of the above-described engagement methods, that is, spline-engagement, press-fitting engagement, projection-recess engagement, and engagement with the use of an adhesive engagement may be used in combination to fit the flange member to the motor shaft. As a result, it is possible to prevent the movement of the flange member relative to the motor shaft, and to reliably prevent generation of abnormal noise.

What is claimed is:

1. An electric power steering system, comprising:
   a rack shaft that is able to reciprocate in an axial direction;
   a motor shaft through which the rack shaft passes, and which is rotated by a motor; and
   a ball screw device that converts rotation of the motor shaft into axial movement of the rack shaft,
   wherein the ball screw device is formed by securing a ball screw nut to an axial end portion of the motor shaft and arranging a plurality of balls within a helical ball-rolling path that is formed by aligning a thread groove formed in an inner periphery of the ball screw nut and a thread groove formed in an outer periphery of the rack shaft with each other,
   wherein a hollow threaded shaft is formed in an axial end portion of the ball screw nut of the ball screw device, and the ball screw nut is screwed to the axial end portion of the motor shaft by screwing the threaded shaft to a threaded portion formed in the motor shaft, and
   wherein a restriction portion that restricts relative rotation between the ball screw nut and the motor shaft is provided.

2. The electric power steering system according to claim 1, wherein:
   at least one of the ball screw nut and the motor shaft has a thin-plate portion that is arranged on an outer side of an engagement recess formed in an outer periphery of the other of the ball screw nut and the motor shaft; and
   the restriction portion is formed by swaging the thin-plate portion into the engagement recess.

3. The electric power steering system according to claim 2, wherein:
   the engagement recess has a side wall in a circumferential direction, and is formed in the outer periphery of the ball screw nut; and
   the thin-plate portion extends from the axial end portion of the motor shaft in the axial direction in such a manner that the thin-plate portion is arranged on a radially outer side of the engagement recess when the ball screw nut is screwed to the motor shaft.

4. The electric power steering system according to claim 3, wherein the thin-plate portion is formed as an annular member that surrounds the outer periphery of the ball screw nut.

5. The electric power steering system according to claim 4, wherein the restriction portion is formed by engaging an engagement piece formed by cutting the thin-plate portion with the side wall of the engagement recess through a swaging process.

6. The electric power steering system according to claim 3 wherein the thin-plate portion is formed on a member that is fitted to the motor shaft in such a manner that the member is not allowed to rotate at least in such a direction that the ball screw nut is loosened.

7. The electric power steering system according to claim 1, wherein the restriction portion is formed of a first engagement portion that extends from one of the ball screw nut and the motor shaft in the axial direction, and a second engagement portion that is engaged with the first engagement portion on a side of the other of the ball screw nut and the motor shaft.

8. The electric power steering system according to claim 7, wherein:
flange portions that extend radially outward are formed at the axial end portions of the ball screw nut and the motor shaft, which face each other; and
the restriction portion is formed of a columnar member that is fitted to one of the flange portions and that constitutes the first engagement portion, and a through-hole which is formed in the other flange portion that faces the flange portion to which the columnar member is fitted, through which the columnar member is passed, and which constitutes the second engagement portion.

9. The electric power steering system according to claim 8, wherein:
the flange portion on the motor shaft-side is formed by screwing a flange member to the motor shaft coaxially in such a manner that a screw direction of the flange member is opposite to a screw direction of the ball screw nut; and
the through-hole is formed as a long hole that extends in a circumferential direction.

10. The electric power steering system according to claim 8, wherein the columnar member is screwed to the flange portion.

11. The electric power steering system according to claim 1, further comprising:
a cylindrical member that is fitted to the motor shaft in such a manner that the cylindrical member is movable in the axial direction and not allowed to rotate relative to the motor shaft,
wherein the restriction portion is formed by screwing a nut to threaded portions formed in an outer periphery of the ball screw nut and an outer periphery of the cylindrical member.

12. The electric power steering system according to claim 1, further comprising:
a ball bearing,
wherein the ball bearing is arranged between the ball screw nut and a first housing that houses the ball screw nut, and an opening formed at an axial end portion of the first housing is blocked by fitting a second housing to the first housing,
wherein a flange portion that extends radially outward is formed at an axial end portion of the ball screw nut, which is close to the motor shaft, and an inserted portion that is arranged in the first housing is formed in the second housing, and
wherein the flange portion of the ball screw nut and the inserted portion of the second housing contact respective axial end faces of the ball bearing.

13. The electric power steering system according to claim 1, wherein:
a fitting hole used to fit a feeding connector is formed in the motor housing that houses the motor shaft; and
the restriction portion is located at a position that corresponds to the fitting hole.

14. The electric power steering system according to claim 1, further comprising:
a flange member that is arranged on a radially outer side of the motor shaft, and that is spline-engaged with the motor shaft,
wherein at least one of the ball screw nut and the flange member has a thin-plate portion that is arranged on an outer side of an engagement recess formed in an outer periphery of the other of the ball screw nut and the flange member, and
wherein rotation of the ball screw nut relative to the motor shaft is restricted by swaging the thin-plate portion into the engagement recess.

15. The electric power steering system according to claim 14, wherein:
the flange member is spline-engaged with the motor shaft with a clearance left between the flange member and the motor shaft in the axial direction; and
an elastic member that urges the flange member in the axial direction is provided at an axial end portion of the flange member.

16. The electric power steering system according to claim 14, wherein:
a projection is formed in one of an outer peripheral face of the motor shaft and an inner peripheral face of the flange member;
a recess is formed in the other of the outer peripheral face of the motor shaft and the inner peripheral face of the flange member; and
when the flange member is arranged at a predetermined position of the motor shaft, the projection is engaged in the recess.

17. The electric power steering system according to claim 14, wherein the motor shaft is press-fitted to the flange member.

18. The electric power steering system according to claim 14, wherein the flange member is secured to the motor shaft with use of an adhesive agent.

19. The electric power steering system according to claim 1, further comprising:
a flange member that is arranged on a radially outer side of the motor shaft, and that is press-fitted to the motor shaft,
wherein at least one of the ball screw nut and the flange member has a thin-plate portion that is arranged on an outer side of an engagement recess formed in an outer periphery of the other of the ball screw nut and the flange member, and
wherein rotation of the ball screw nut relative to the motor shaft is restricted by swaging the thin-plate portion into the engagement recess.

* * * * *